United States Patent
Ito et al.

(10) Patent No.: US 8,179,760 B2
(45) Date of Patent: *May 15, 2012

(54) REPRODUCTION SIGNAL EVALUATION METHOD, INFORMATION RECORDING MEDIUM, REPRODUCTION APPARATUS AND RECORDING APPARATUS

(75) Inventors: Kiyotaka Ito, Hyogo (JP); Yasumori Hino, Nara (JP); Harumitsu Miyashita, Nara (JP); Isao Kobayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 69 days.

This patent is subject to a terminal disclaimer.

(21) Appl. No.: 12/573,200

(22) Filed: Oct. 5, 2009

(65) Prior Publication Data

US 2010/0097908 A1    Apr. 22, 2010

Related U.S. Application Data

(63) Continuation-in-part of application No. 12/244,231, filed on Oct. 2, 2008, now abandoned.

(51) Int. Cl.
  *G11B 5/09* (2006.01)
  *G11B 20/10* (2006.01)
  *G11B 27/36* (2006.01)
  *G11B 7/0045* (2006.01)

(52) U.S. Cl. ............... 369/53.31; 369/59.11; 369/59.12; 369/59.13; 369/59.15; 369/59.17; 369/59.19

(58) Field of Classification Search ............... 369/53.31, 369/59.11, 59.12, 59.13, 59.15, 59.17, 59.19, 369/59.2, 59.26, 59.27

See application file for complete search history.

(56) References Cited

U.S. PATENT DOCUMENTS

| | | | |
|---|---|---|---|
| 6,256,266 | B1 | 7/2001 | Mitani |
| 2003/0067998 | A1 | 4/2003 | Nakajima et al. |
| 2003/0174622 | A1 | 9/2003 | Nagai et al. |

(Continued)

FOREIGN PATENT DOCUMENTS

EP    2 051 256 A1    4/2009

(Continued)

OTHER PUBLICATIONS

Illustrated Blu-ray Disc Reader ("Zukai Blu-ray Disc Dokuhon"); published by Ohmsha, Ltd., Dec. 10, 2006; pp. 136-137, 144-155, 246-247 (including concise explanation and partial English translation).

(Continued)

*Primary Examiner* — Joseph Feild
*Assistant Examiner* — Aneeta Yodichkas
(74) *Attorney, Agent, or Firm* — Renner, Otto, Boisselle & Sklar, LLP

(57) ABSTRACT

A reproduction signal evaluation method according to the present invention relates to adjustment of an edge portion between a shortest mark and a shortest space in a data sequence including marks and spaces in combination that is recordable on an information recording medium. In a pattern including a shortest mark and a shortest space adjacent before or after the shortest mark, a shift amount of an edge of the shortest mark is obtained from a differential metric calculated regarding one of a first pattern in which a space adjacent to the shortest mark and not adjacent to the shortest space is longer than the shortest space; and a second pattern in which a mark adjacent to the shortest space and not adjacent to the shortest mark is longer than the shortest mark.

4 Claims, 18 Drawing Sheets

U.S. PATENT DOCUMENTS

| | | | |
|---|---|---|---|
| 2004/0208101 A1 | 10/2004 | Ohkubo et al. | |
| 2005/0078579 A1 | 4/2005 | Miyashita et al. | |
| 2005/0128911 A1 | 6/2005 | Miyashita et al. | |
| 2008/0159104 A1* | 7/2008 | Miyashita et al. | 369/53.41 |
| 2009/0073835 A1 | 3/2009 | Adachi et al. | |
| 2009/0103412 A1 | 4/2009 | Miyashita et al. | |
| 2009/0180368 A1 | 7/2009 | Miyashita et al. | |
| 2009/0225639 A1* | 9/2009 | Miyashita et al. | 369/53.11 |
| 2010/0002556 A1* | 1/2010 | Miyashita et al. | 369/53.31 |
| 2010/0085851 A1* | 4/2010 | Ito et al. | 369/53.1 |
| 2010/0097908 A1 | 4/2010 | Ito et al. | |
| 2010/0302925 A1* | 12/2010 | Ito et al. | 369/53.31 |

FOREIGN PATENT DOCUMENTS

| | | |
|---|---|---|
| JP | 2003-141823 | 5/2003 |
| JP | 2003-272304 | 9/2003 |
| JP | 2004-213862 | 7/2004 |
| JP | 2004-335079 | 11/2004 |
| JP | 2008-047181 | 2/2008 |
| WO | 2008/081820 A1 | 7/2008 |

OTHER PUBLICATIONS

Adaptive Signal Processing Algorithm ("Tekioh Shingoshori Algorithm"); published by Baifukan Co., Ltd.; Jul. 19, 2000; pp. 32-35 (including partial English translation).

International Search Report for corresponding Application No. PCT/JP2009/004999 dated Oct. 27, 2009.

PCT/ISA/237 and a partial English translation, Oct. 2009.

Illustrated Blu-ray Disc Reader published by Ohmsha, Ltd., Dec. 10, 2006, pp. 13-28 and a concise explanation.

(Illustrated) Blu-ray Disc Reader published by Ohmsha, Ltd., Dec. 10, 2006; pp. 247-248 with partial English translation.

White paper, Blu-ray Disc Format, General, Aug. 2004, pp. 1-37.

White paper, Blu-ray Disc Format, 3. File System Specifications for BD-RE, R, ROM, Aug. 2004, pp. 1-6.

White paper, Blu-ray Disc Format, 4. Key Technologies, Aug. 2004, pp. 1-8.

* cited by examiner

FIG. 8

START

| | | | 2M | | 3M | 4M | ≥5M |
|---|---|---|---|---|---|---|---|
| | | M(i) → S(i+1) → M(i+2) | 2S / 2M | (≥3S) / (≥3M) | xS / xM | xS / xM | xS / xM |
| S(i-3) | M(i-2) | S(i-1) | | | | | |
| 2S | 2M | 2S | | | | [12A]4B X0011001110 0X | [12A]5B X0011001111 00X | [12A]6B X0011001111 1X |
| | | (≥3S) | | | [12A]7B, [12A]16B X1110011100X | [12A]8B, [12A]17B X1110011100X | [12A]9B, [12A]18B X1110011111X |
| (≥3S) | xM | 3S | [12A]15B X11000110001 1X | [12A]13B, [12A]14B X110001100 0X | | | |
| xS | | 4S | [12A]12B X110000110001 1X | [12A]10B, [12A]11B X110000110 00X | | | |
| | | ≥5S | [12A]3B X000001100 11X | [12A]1B, [12A]2B X000001100 0X | | | |

END

| | | | 2M | | 3M | 4M | ≥5M |
|---|---|---|---|---|---|---|---|
| | | M(i) → S(i-1) → M(i+2) | 2S / 2M | (≥3S) / (≥3M) | xS / xM | xS / xM | xS / xM |
| S(i+3) | M(i+2) | S(i+1) | | | | | |
| 2S | 2M | 2S | | | | [12A]4A X0011001110 0X | [12A]5A X0011110011 00X | [12A]6A X1111100110 0X |
| | | (≥3S) | | | [12A]7A, [12A]9A X0011110011 1X | [12A]8A, [12A]9A X0011110011 1X | [12A]17A, [12A]18A X1111100111 1X |
| (≥3S) | xM | 3S | [12A]15A X11001100011 1X | [12A]3A, [12A]12A X000110001 1X | | | |
| xS | | 4S | [12A]14A X110011000011 1X | [12A]2A, [12A]11A X000110001 1X | | | |
| | | ≥5S | [12A]13A X1100110000 0X | [12A]1A, [12A]10A X0000110000 0X | | | |

FIG.9

START

| S(i-3) | M(i-2) | M(i-1) / S(i) / S(i-1) / M(i+1) / S(i-1) / M(i+2) | 2M / 2S / 2M | 2M / 2S / (≥3M) | 3M / xS / xM | 4M / xS / xM | ≥5M / xS / xM |
|---|---|---|---|---|---|---|---|
| 2S | 2M | 2S | | | [12B]13A X1100110011100X | [12B]14A X1100110011100X | [12B]15A X1100110011111X |
| (≥3S) | | | | | [12B]1A, [12B]10A X0001100111100X | [12B]2A, [12B]11A X0001100111100X | [12B]3A, [12B]12A X0001100111111X |
| xS | (≥3M) | 3S | [12B]13B X1100011001100X | [12B]14B, [12B]15B X1100011001111X | | | |
| | xM | 4S | [12B]10B X1100001100111X | [12B]11B, [12B]12B X1100001100111X | | | |
| | | ≥5S | [12B]1B X0000001100111X | [12B]2B, [12B]3B X0000001100111X | | | |

END

| S(i+3) | M(i+2) | M(i) / S(i-1) / M(i-1) / S(i+1) / M(i-2) | 2M / 2S / 2M | 2M / 2S / (≥3M) | 3M / xS / xM | 4M / xS / xM | ≥5M / xS / xM |
|---|---|---|---|---|---|---|---|
| 2S | 2M | 2S | | | [12B]6A X0011100110011X | [12B]9A X0011100110011X | [12B]18A X1111100110011X |
| (≥3S) | | | | | [12B]4A, [12B]5A X0011110011000X | [12B]7A, [12B]8A X0011110011000X | [12B]16A, [12B]17A X1111110011000X |
| xS | (≥3M) | 3S | [12B]6B X0011001100011X | [12B]9B, [12B]18B X1110011001111X | | | |
| | xM | 4S | [12B]5B X0011001000011X | [12B]8B, [12B]17B X1110011100011X | | | |
| | | ≥5S | [12B]4B X0011001000000X | [12B]7B, [12B]16B X1110011100000X | | | |

FIG.21
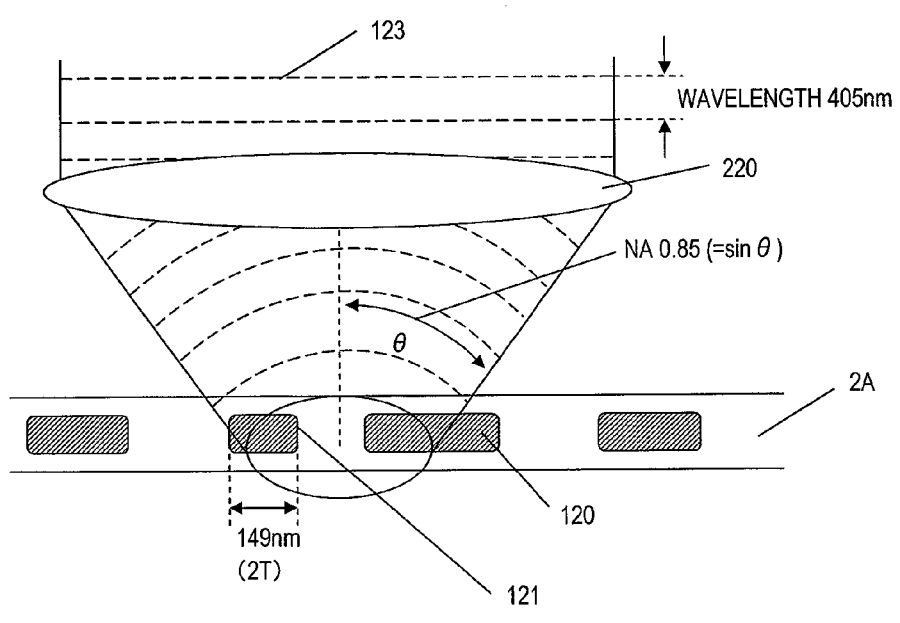
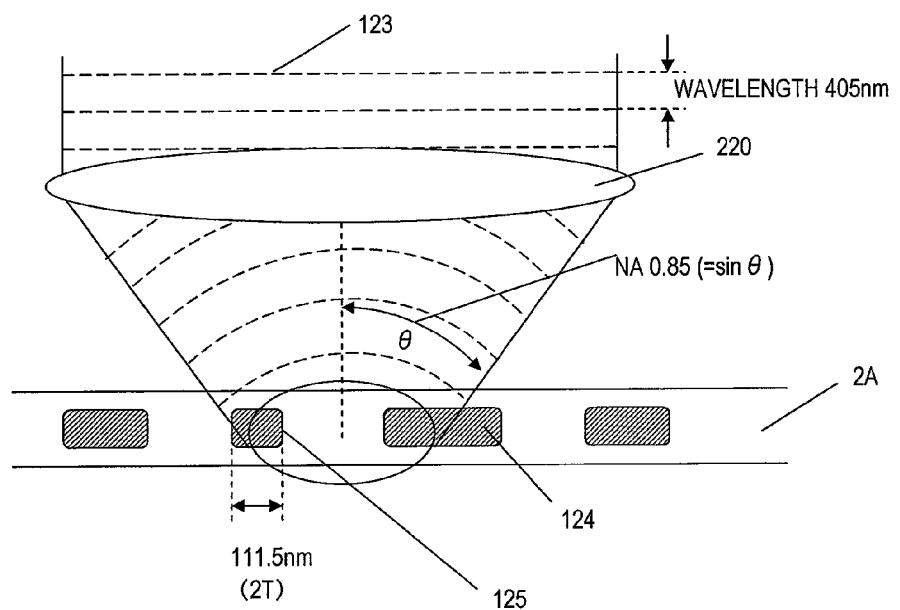

2A  121  30A

FIG.25
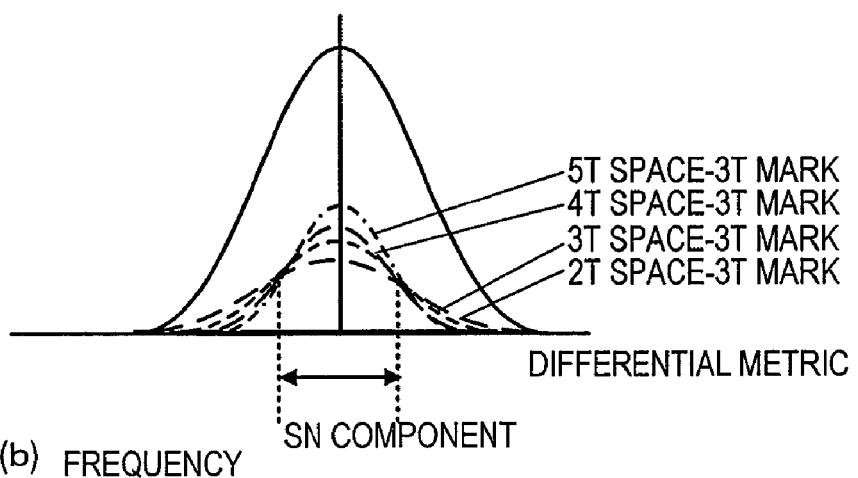
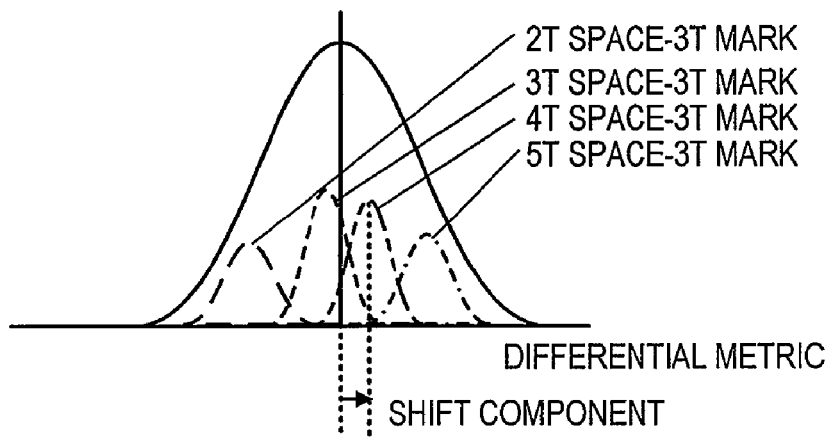

REPRODUCTION SIGNAL EVALUATION METHOD, INFORMATION RECORDING MEDIUM, REPRODUCTION APPARATUS AND RECORDING APPARATUS

This application is a Continuation-in-Part of U.S. patent application Ser. No. 12/244,231 filed on Oct. 2, 2008 now abandoned which is hereby incorporated herein by reference in its entirety.

BACKGROUND OF THE INVENTION

1. Field of the Invention

The present invention relates to a signal processing method using maximum likelihood decoding and a method for evaluating an information recording medium using maximum likelihood decoding.

2. Description of the Related Art

Recently, as the recording density for information recording mediums is being improved, the shortest mark length of recording marks is approaching the limit of the resolving power, which relies on a detection system.

In the case where, for example, an information recording medium is an optical disc medium, the "resolving power, which relies on a detection system" means an optical resolving power, which relies on the size of an optical spot generated by collecting laser light.

Due to the limit of the resolving power, increase of the inter-code interference and deterioration of SNR (Signal to Noise Ratio) are more conspicuous. As a result, a PRML (Partial Response Maximum Likelihood) method or the like is now used generally as a signal processing method.

The PRML method is a technology generated by combining partial response (PR) and maximum likelihood (ML). By the PRML method, with a premise that known inter-code interference occurs, a signal sequence having the maximum likelihood is selected from a reproduction waveform.

Owing to this, the PRML method is known to improve the decoding capability than a conventional level determination method (e.g., Non-Patent Document No. 1 ("Illustrated Blu-ray Disc Reader" ("Zukai Btu-ray Disc Dokuhon") published by Ohmsha, Ltd.)).

In the meantime, because the signal processing method is now changed from the level determination method to the PRML method, problems occur in the evaluation method of a reproduction signal.

Jitter, which is a conventionally used reproduction signal evaluation index, is used with a premise that signal processing is performed by the level determination method. Therefore, occasionally, jitter may not be correlated with the decoding capability of the PRML method, which is based on a different signal processing algorithm from the level determination method.

Under the circumstances, new indices which are correlated with the decoding capability of the PRML method has been proposed (e.g., Patent Document No. 1 (Japanese Laid-Open Patent Publication No. 2003-141823) and Patent Document No. 2 (Japanese Laid-Open Patent Publication No. 2004-213862)).

Now, a case where the recording and reproduction quality is detected as distributions shown in FIG. 25 will be discussed.

FIG. 25 shows four distributions of differential metrics classified by the length of the space of 2T, 3T, 4T or 5T combined with a 3T-long mark, and the total of the four distributions. T represents a channel clock.

In FIG. 25, only 3T-long marks are classified as an example, but usually marks of other lengths are also classified.

In the case where classification is made by the length of the mark and the length of the space, there are the following two cases. In the case of FIG. 25(a), an SN component, which is the distribution width, is dominant in the distributions of in all the mark-space combinations. In the case of FIG. 25(b), an SN component of each pattern is good, but a shift component from the center of the distribution is different among the patterns. When the distributions are summed up, it appears that the SN component is poor.

The index described in Patent Document No. 1 (Japanese Laid-Open Patent Publication No. 2003-141823) cannot distinguish whether each distribution of differential metric is caused by an SN component or by a shift component.

Patent Document No. 3 (Japanese Laid-Open Patent Publication No. 2004-335079) solves this problem.

The index proposed in Patent Document No. 3 (Japanese Laid-Open Patent Publication No. 2004-335079) can detect a positional shift between a mark and a space (edge shift) by a combination of a mark length and a space length.

Namely, the level of the recording and reproduction quality obtained by the index proposed in Patent Document No. 1 (Japanese Laid-Open Patent Publication No. 2003-141823) can be distinguished as corresponding to an SN component or as corresponding to a shift component.

Owing to such distinguishing between an SN component and a shift component, it is now possible to analyze which type of error occurs in which pattern.

As described above, as the recording density of information recording mediums is more improved, the problems of the inter-code interference and SN deterioration will be more serious.

It is described in Non-Patent Document No. 1 ("Illustrated Blu-ray Disc Reader" ("Zukai Blu-ray Disc Dokuhon"), Ohmsha, Ltd.) that the system margin of an information recording and reproduction apparatus can be maintained by using a higher-order PRML method.

For example, when the recording capacity of one recording layer of a 12-cm optical disc medium is 25 GB, the system margin can be maintained by adopting the PR1221ML method.

The above-mentioned book describes that when the recording capacity of one recording layer is 33.3 GB, the PR12221ML method needs to be adopted.

Patent Document No. 3 (Japanese Laid-Open Patent Publication No. 2004-335079) proposes an index capable of detecting a positional shift of a combination of one mark and one space (edge shift). The positional shift represents the recording and reproduction quality of an information recording medium.

However, in an information recording medium having a higher recording density, there are marks and spaces which are much shorter than the length detectable by the resolving power of the detection system. Therefore, it is necessary to consider a positional shift including a plurality of edges provided by a combination of one or more marks and one or more spaces.

Hereinafter, a positional shift including a plurality of edges will be described.

The description will be given with a 12-cm optical disc medium for blue laser having a wavelength of 405 nm as an example.

According to Non-Patent Document No. 1 ("Illustrated Blu-ray Disc Reader", Ohmsha, Ltd.), when blue laser is collected on an optical disc medium, the size of an optical spot is 390 nm. When the recording capacity of one recording layer using RLL(1, 7) as a recording code is 25 GB, the length of the shortest mark is 149 nm.

When the recording capacity of one recording layer of this optical disc medium is 33.3 GB, the length of the shortest mark is 112 nm. When the recording density is further improved, the length of the shortest mark is shorter.

Even where an identical detection system is used, when the recording density is 25 GB as shown in FIG. 26(*a*), the number of the shortest marks encompassed in an optical spot 201 is 2.6; whereas when the recording density is 33.3 GB as shown in FIG. 26(*b*), the number of the shortest marks encompassed in the optical spot 201 is 3.5. The length of the marks in the size of optical spot, which acts as the detection system for the optical disc medium, is shorter.

Therefore, an optical spot size may occasionally encompass a combination of a plurality of marks and spaces, instead of a combination of one mark and one space.

As a result, a signal influenced by a positional shift of a plurality of edges is detected, depending on the number of the marks and spaces encompassed in the optical spot size.

For example, a pattern in FIG. 27(*a*) in which one mark is sandwiched by two spaces, and a pattern in FIG. 27(*b*) in which one space is sandwiched by two marks, both include two edges. A pattern in FIG. 27(*c*), which include two marks and two spaces, includes three edges.

The index for evaluating the recording and reproduction quality of an information recording medium described in Patent Document No. 3 (Japanese Laid-Open Patent Publication No. 2004-335079) considers only the case where one edge shift of a combination of a mark length and a space length is included, and does not consider evaluating the recording and reproduction quality regarding a positional shift including a plurality of edges.

Non-Patent Document No. 1 ("Illustrated Blu-ray Disc Reader", Ohmsha, Ltd.) describes that for a 12-cm optical disc medium for blue laser having a recording capacity per layer of 33.3 GB, the PR12221ML method needs to be adopted. Patent Document No. 3 (Japanese Laid-Open Patent Publication No. 2004-335079) describes that the proposed index is applicable to the PR12221ML method.

When the PR12221ML method is used for an optical disc medium using RLL(1, 7) as a recording code, the shortest marks are present in succession, and there is a pattern in which the square of the Euclidean distance between two ideal signals, i.e., a state transition path having the maximum likelihood and a state transition path having the second maximum likelihood, is 12.

The pattern in which the square of the Euclidean distance is 12 will be described later in detail.

The pattern in which the square of the Euclidean distance is 12 includes the shortest marks which are detected as a pattern including a plurality of edges as shown in FIG. 27.

It is now possible to provide an index representing a detection signal including information on a plurality of edge shifts which are detected by the PRML signal processing. However, provision of an index representing how each edge is shifted has not considered so far.

SUMMARY OF THE INVENTION

The present invention for solving the above-described problems of the conventional art has an object of providing a method and an apparatus for evaluating a recording and reproduction quality by classifying detection signals including a plurality of edges into patterns and providing an index for evaluating various positional shifts caused in a high density information recording medium by inter-code interference of recording marks or interference of heat which is used for recording information on the information recording medium.

A reproduction signal evaluation method according to the present invention includes a step of generating a binary signal from an information recording medium on which a data sequence including marks and spaces in combination is recordable, using a PRML signal processing method from a signal obtained by reproducing the data sequence; and a differential calculation step of calculating a differential metric using a first state transition path having a maximum likelihood and a second state transition path having a second maximum likelihood, and a reproduction signal, the first state transition path and the second state transition path being obtained based on the binary signal. In a pattern including a shortest mark and a shortest space adjacent before or after the shortest mark, a shift amount of an edge of the shortest mark is obtained from a differential metric calculated regarding one of a first pattern in which a space adjacent to the shortest mark and not adjacent to the shortest space is longer than the shortest space; and a second pattern in which a mark adjacent to the shortest space and not adjacent to the shortest mark is longer than the shortest mark.

In an embodiment, where a reference cycle of the data sequence is T, the shortest mark and the shortest space each have a length of 2T; and where binary data of a pattern including the shortest mark and the shortest space adjacent to each other is represented by "0" and "1", the shift amount of the edge of the shortest mark is obtained from a differential metric calculated regarding a pattern, the binary data of which is "x000110011x" or "x001100111x" ("x" is "0" or "1").

In an embodiment, where a reference cycle of the data sequence is T, the shortest mark and the shortest space each have a length of 2T; and where binary data of a pattern including the shortest mark and the shortest space adjacent to each other is represented by "0" and "1", the shift amount of the edge of the shortest mark is obtained from a differential metric calculated regarding a pattern, the binary data of which is "x110011000x" or "x111001100x" ("x" is "0" or "1").

An information recording medium according to the present invention is an information recording medium on which a data sequence including marks and spaces in combination is recordable. The information recording medium has a track on which the data sequence is recordable. A reproduction signal from the information recording medium is evaluated using a prescribed method. The prescribed method includes a step of generating a binary signal using a PRML signal processing method from a signal obtained by reproducing the data sequence from the information recording medium; and a differential calculation step of calculating a differential metric using a first state transition path having a maximum likelihood and a second state transition path having a second maximum likelihood, and a reproduction signal, the first state transition path and the second state transition path being obtained based on the binary signal. In a pattern including a shortest mark and a shortest space adjacent before or after the shortest mark, a shift amount of an edge of the shortest mark is obtained from a differential metric calculated regarding one of a first pattern in which a space adjacent to the shortest mark and not adjacent to the shortest space is longer than the shortest space; and a second pattern in which a mark adjacent to the shortest space and not adjacent to the shortest mark is longer than the shortest mark.

A reproduction apparatus according to the present invention is a reproduction apparatus for reproducing information from the above-described information recording medium. The reproduction apparatus includes an irradiation section for irradiating the track with laser light; a light receiving section for receiving reflected light of the laser light used for the irradiation; and a reproduction section for reproducing the data sequence based on a signal obtained by the received light.

A recording apparatus according to the present invention is a recording apparatus for recording information on the above-described information recording medium. The recording apparatus includes an irradiation section for irradiating the track with laser light; and a recording section for forming marks on the track by the irradiation to record a data sequence including marks and spaces between the marks arranged alternately.

A reproduction signal evaluation method according to the present invention is a method for evaluating a reproduction signal obtained from an information recording medium on which a data sequence including marks and spaces in combination is recordable. The method includes a recognition step of recognizing a prescribed pattern from the data sequence; and an evaluation step of evaluating a reproduction signal corresponding to the recognized pattern. The recognition step includes the steps of recognizing a pattern, included in the data sequence, including a first mark, a first space adjacent before or after the first mark, and a second mark not adjacent to the first mark and adjacent to the first space; and recognizing, when the first space and the second mark each have a length equal to or shorter than a prescribed length, whether or not a second space not adjacent to the first mark and adjacent to the second mark is longer than the prescribed length.

An information recording medium according to the present invention is an information recording medium on which a data sequence including marks and spaces in combination is recordable. The information recording medium has a track on which the data sequence is recordable. A reproduction signal from the information recording medium is evaluated using a prescribed method. The prescribed method includes a recognition step of recognizing a prescribed pattern from the data sequence; and an evaluation step of evaluating a reproduction signal corresponding to the recognized pattern. The recognition step includes the steps of recognizing a pattern, included in the data sequence, including a first mark, a first space adjacent before or after the first mark, and a second mark not adjacent to the first mark and adjacent to the first space; and recognizing, when the first space and the second mark each have a length equal to or shorter than a prescribed length, whether or not a second space not adjacent to the first mark and adjacent to the second mark is longer than the prescribed length.

A reproduction apparatus according to the present invention is a reproduction apparatus for reproducing information from the above-described information recording medium. The reproduction apparatus includes an irradiation section for irradiating the track with laser light; a light receiving section for receiving reflected light of the laser light used for the irradiation; and a reproduction section for reproducing the data sequence based on a signal obtained by the received light.

A recording apparatus according to the present invention is a recording apparatus for recording information on the above-described information recording medium. The recording apparatus includes an irradiation section for irradiating the track with laser light; and a recording section for forming marks on the track by the irradiation to record a data sequence including marks and spaces between the marks arranged alternately.

A reproduction signal evaluation method according to the present invention is a method for evaluating a reproduction signal obtained from an information recording medium on which a data sequence including marks and spaces in combination is recordable. The method includes a recognition step of recognizing a prescribed pattern from the data sequence; and an evaluation step of evaluating a reproduction signal corresponding to the recognized pattern. The recognition step includes the steps of recognizing a pattern, included in the data sequence, including a first mark, a first space adjacent before or after the first mark, and a third space not adjacent to the first space and adjacent to the first mark; and recognizing, when the first mark and the third space each have a length equal to or shorter than a prescribed length, whether or not a third mark not adjacent to the first space and adjacent to the third space is longer than the prescribed length.

An information recording medium according to the present invention is an information recording medium on which a data sequence including marks and spaces in combination is recordable. The information recording medium has a track on which the data sequence is recordable. A reproduction signal from the information recording medium is evaluated using a prescribed method. The prescribed method includes a recognition step of recognizing a prescribed pattern from the data sequence; and an evaluation step of evaluating a reproduction signal corresponding to the recognized pattern. The recognition step includes the steps of recognizing a pattern, included in the data sequence, including a first mark, a first space adjacent before or after the first mark, and a third space not adjacent to the first space and adjacent to the first mark; and recognizing, when the first mark and the third space each have a length equal to or shorter than a prescribed length, whether or not a third mark not adjacent to the first space and adjacent to the third space is longer than the prescribed length.

A reproduction apparatus according to the present invention is a reproduction apparatus for reproducing information from the above-described information recording medium. The reproduction apparatus includes an irradiation section for irradiating the track with laser light; a light receiving section for receiving reflected light of the laser light used for the irradiation; and a reproduction section for reproducing the data sequence based on a signal obtained by the received light.

A recording apparatus according to the present invention is a recording apparatus for recording information on the above-described information recording medium. The recording apparatus includes an irradiation section for irradiating the track with laser light; and a recording section for forming marks on the track by the irradiation to record a data sequence including marks and spaces between the marks arranged alternately.

According to the present invention, a shift amount of the edge of the shortest mark of a 2T/2T portion, which is a 2T-continuous pattern, is obtained by calculating a differential metric of a pattern including a 3T or longer mark or space provided before or after the 2T/2T portion. Owing to this, even where a sufficient signal fluctuation of the 2T/2T portion is not obtained, the shift amount of the edge of the shortest mark of the 2T/2T portion can be detected.

The present invention is directed to a signal evaluation method, usable for an information recording medium having a data sequence including a mark and a space located alternately, for generating a binary signal from a signal obtained by reproducing the data sequence using a PRML signal processing method and evaluating a likelihood of the binary signal. From the binary signal, a differential metric which is a difference of a reproduction signal from a first state transition path having a maximum likelihood and a second state transition path having a second maximum likelihood is calculated.

The differential metric is classified to any of a plurality of data patterns each including at least one mark and at least one space. The data pattern classification to any of a plurality of data patterns is performed using a combination of a length of a first mark included in the data sequence and a length of a first space adjacently located immediately previous or immediately subsequent to the first mark, and is further performed using a length of a second mark which is not adjacent to the first mark and located adjacent to the first space. Thus, a reproduction signal quality of the information recording medium is evaluated, and an index for an edge shift of each data pattern including at least one edge can be provided.

The present invention is also directed to a signal evaluation method, usable for an information recording medium having a data sequence including a mark and a space located alternately, for generating a binary signal from a signal obtained by reproducing the data sequence using a PRML signal processing method and evaluating a likelihood of the binary signal. From the binary signal, a differential metric which is a difference of a reproduction signal from a first state transition path having a maximum likelihood and a second state transition path having a second maximum likelihood is calculated. The differential metric is classified to any of a plurality of data patterns each including at least one mark and at least one space. The data pattern classification to any of a plurality of data patterns is performed using a combination of a length of a first mark included in the data sequence and a length of a first space adjacently located immediately previous or immediately subsequent to the first mark, and is further performed using a length of a third space which is not adjacent to the first space and located adjacent to the first mark. Thus, a reproduction signal quality of the information recording medium is evaluated, and an index for an edge shift of each data pattern including at least one edge can be provided.

BRIEF DESCRIPTION OF THE DRAWINGS

FIG. 8 shows classification into detailed patterns of differential metrics having a 12A-detection pattern by PR(1,2,2,2,1)ML according to the embodiment of the present invention.

FIG. 9 shows classification into detailed patterns of differential metrics having a 12B-detection pattern by PR(1,2,2,2,1)ML according to the embodiment of the present invention.

FIG. 21($a$) shows an example of a 25 GB BD, and FIG. 21($b$) shows an example of an optical disc having a higher recording density than that of the 25 GB BD according to an embodiment of the present invention.

FIG. 25 shows an example of distributions of differential metrics of different patterns.

DETAILED DESCRIPTION OF PREFERRED EMBODIMENTS

Figure 1:
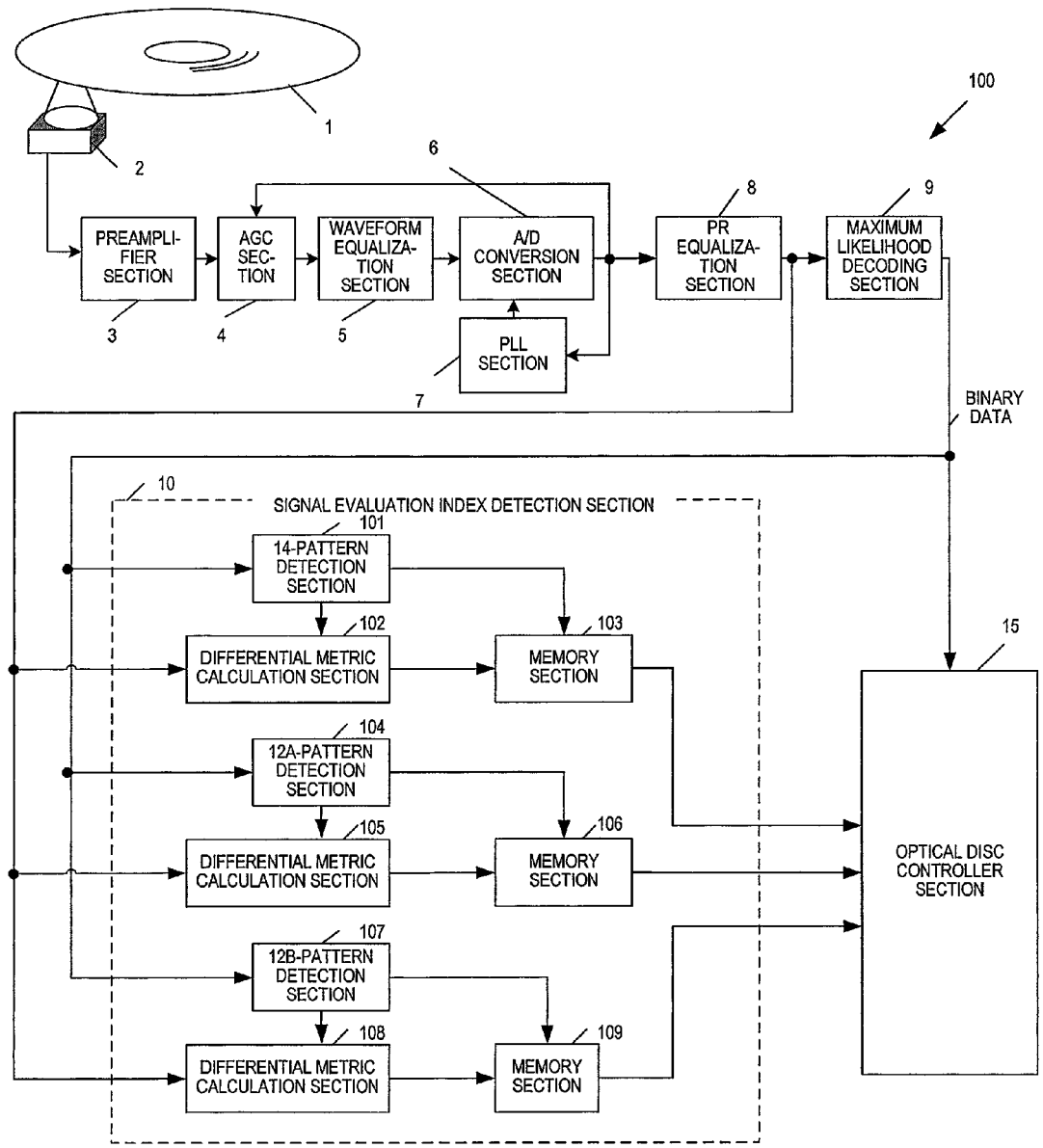
FIG. 1 shows an optical disc apparatus according to an embodiment of the present invention.

Hereinafter, embodiments of the present invention will be described with reference to the drawings. Identical elements bear identical reference numerals, and identical descriptions thereof will be omitted.

Figure 2:
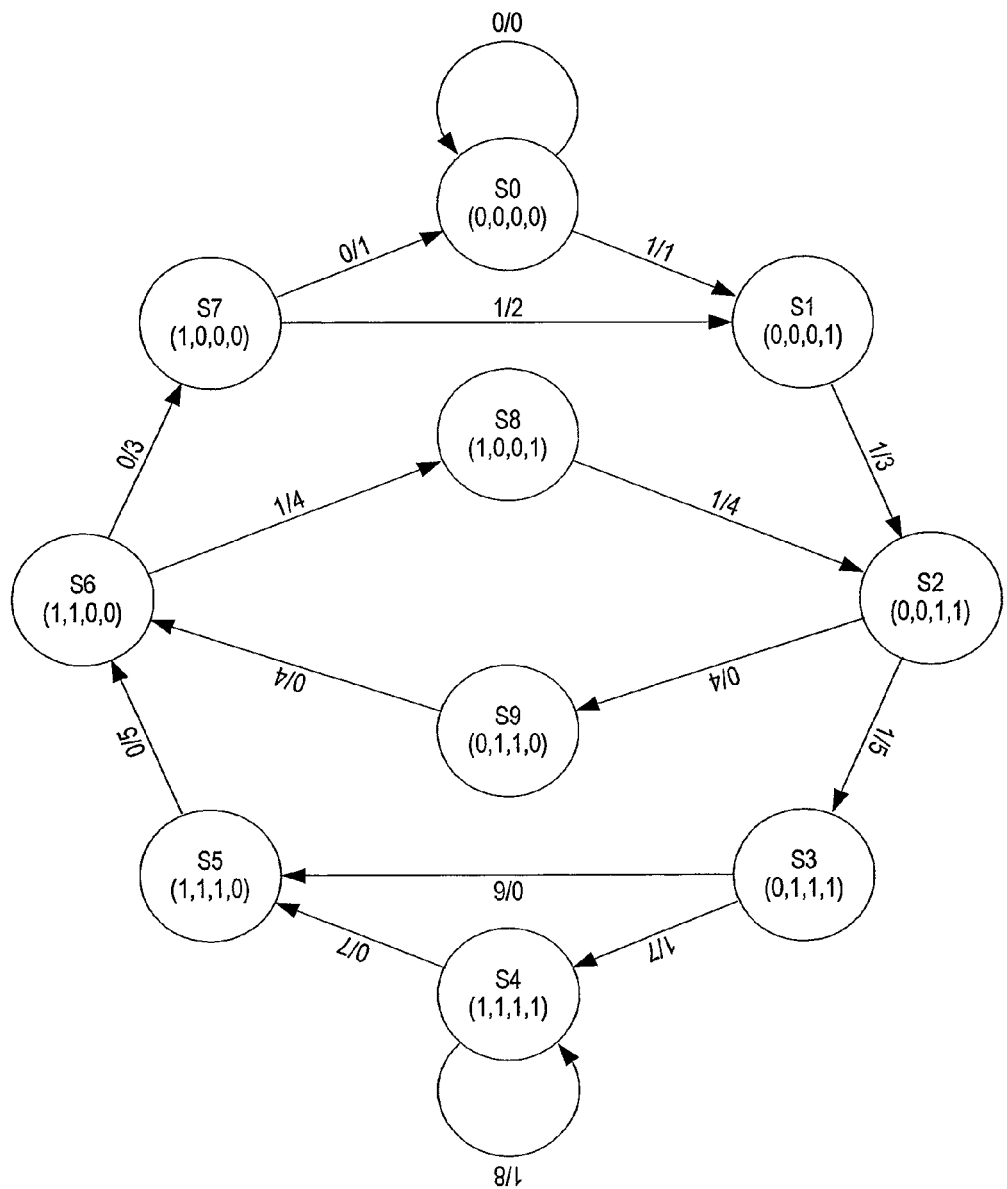
FIG. 2 shows a state transition rule defined by the RLL(1, 7) recording code and the equalization method PR(1,2,2,2,1) according to the embodiment of the present invention.
Figure 3:
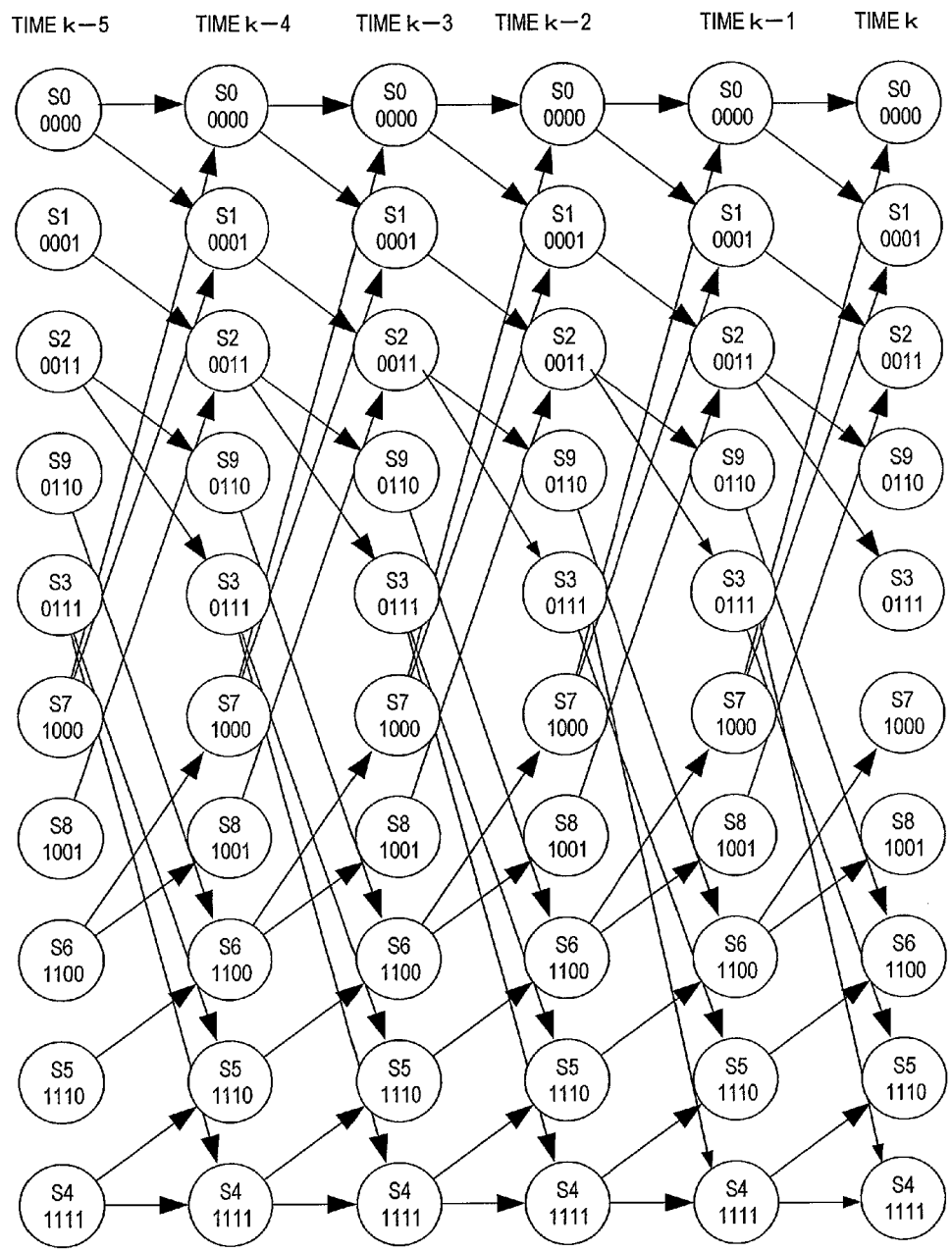
FIG. 3 is a trellis diagram corresponding to the state transition rule shown in FIG. 2.

With reference to FIG. 1, an optical disc apparatus (signal evaluation apparatus) using a PRML method according to an embodiment of the present invention will be described. The optical disc apparatus evaluates a signal obtained, from an information recording medium on which a data sequence including marks and spaces in combination can be recorded, by reproducing the data sequence using a PRML signal processing method. In the optical disc apparatus, a PR12221ML method is adopted for signal processing of a reproduction system, and an RLL (Run Length Limited) code such as an RLL(1, 7) code is used as a recording code. First, with reference to FIG. 2 and FIG. 3, PR12221ML will be described briefly. FIG. 2 is a state transition diagram showing a state transition rule defined by the RLL(1, 7) recording code and the equalization method PR(1,2,2,2,1). FIG. 3 is a trellis diagram corresponding to the state transition diagram shown in FIG. 2.

By the combination of PR12221ML and RLL(1, 7), the number of states in a decoding section is limited to 10, the number of state transition paths is 16, and the number of reproduction levels are 9.

Referring to the state transition rule of PR12221 shown in FIG. 2, ten states at a certain time are represented as follows. State S(0,0,0,0) is represented as "0, state S(0,0,0,1) is represented as S1, state S(0,0,1,1) is represented as S2, state S(0,1,1,1) is represented as S3, state S(1,1,1,1) is represented as S4, state S(1,1,1,0) is represented as S5, state S(1,1,0,0) is represented as S6, state S(1,0,0,0) is represented as S7, state S(1,0,0,1) is represented as S8, and state S(0,1,1,0) is represented as S9. "0" or "1" in parentheses represents a signal on the time axis, and represents which state will possibly occur at the next time by a state transition from one state. The trellis diagram is obtained by developing this state transition diagram along the time axis.

In the state transition of PR12221ML shown in FIG. 3, there are numerous state transition path patterns (state combinations) by which a prescribed state at one time is changed to another prescribed state at the next time via either one of two state transitions. However, the patterns which are highly likely to cause an error are limited to specific patterns which are difficult to be distinguished. Focusing on such patterns which are likely to cause an error, the state transition path patterns of PR12221 can be summarized as Tables 1, 2 and 3.

TABLE 1

| State transition | Transition data sequence $(b_{k-i}, \ldots, b_k)$ | Pattern | k−9 | k−8 | k−7 | k−6 | k−5 | k−4 | k−3 | k−2 | k−1 | k | PR equalization ideal value | | | | | Inter-path Euclidean distance |
|---|---|---|---|---|---|---|---|---|---|---|---|---|---|---|---|---|---|---|
| $S0_{k-5} \to S6_k$ | (0, 0, 0, 0, x, 1, 1, 0, 0) | [14]1A | | | | | S0 | S1 | S2 | S3 | S5 | S6 | 1 | 3 | 5 | 6 | 5 | |
| | | [14]1B | | | | | S0 | S0 | S1 | S2 | S9 | S6 | 0 | 1 | 3 | 4 | 4 | 14 |
| $S0_{k-5} \to S5_k$ | (0, 0, 0, 0, x, 1, 1, 1, 0) | [14]2A | | | | | S0 | S1 | S2 | S3 | S4 | S5 | 1 | 3 | 5 | 7 | 7 | |
| | | [14]2B | | | | | S0 | S0 | S1 | S2 | S3 | S5 | 0 | 1 | 3 | 5 | 6 | 14 |
| $S0_{k-5} \to S4_k$ | (0, 0, 0, 0, x, 1, 1, 1, 1) | [14]3A | | | | | S0 | S1 | S2 | S3 | S4 | S4 | 1 | 3 | 5 | 7 | 8 | |
| | | [14]3B | | | | | S0 | S0 | S1 | S2 | S3 | S4 | 0 | 1 | 3 | 5 | 7 | 14 |
| $S2_{k-5} \to S0_k$ | (0, 0, 1, 1, x, 0, 0, 0, 0) | [14]4A | | | | | S2 | S3 | S5 | S6 | S7 | S0 | 5 | 6 | 5 | 3 | 1 | |
| | | [14]4B | | | | | S2 | S9 | S6 | S7 | S0 | S0 | 4 | 4 | 3 | 1 | 0 | 14 |
| $S2_{k-5} \to S1_k$ | (0, 0, 1, 1, x, 0, 0, 0, 1) | [14]5A | | | | | S2 | S3 | S5 | S6 | S7 | S1 | 5 | 6 | 5 | 3 | 2 | |
| | | [14]5B | | | | | S2 | S9 | S6 | S7 | S0 | S1 | 4 | 4 | 3 | 1 | 1 | 14 |
| $S2_{k-5} \to S2_k$ | (0, 0, 1, 1, x, 0, 0, 1, 1) | [14]6A | | | | | S2 | S3 | S5 | S6 | S8 | S2 | 5 | 6 | 5 | 4 | 4 | |
| | | [14]6B | | | | | S2 | S9 | S6 | S7 | S1 | S2 | 4 | 4 | 3 | 2 | 3 | 14 |
| $S3_{k-5} \to S0_k$ | (0, 1, 1, 1, x, 0, 0, 0, 0) | [14]7A | | | | | S3 | S4 | S5 | S6 | S7 | S0 | 7 | 7 | 5 | 3 | 1 | |
| | | [14]7B | | | | | S3 | S5 | S6 | S7 | S0 | S0 | 6 | 5 | 3 | 1 | 0 | 14 |
| $S3_{k-5} \to S1_k$ | (0, 1, 1, 1, x, 0, 0, 0, 1) | [14]8A | | | | | S3 | S4 | S5 | S6 | S7 | S1 | 7 | 7 | 5 | 3 | 2 | |
| | | [14]8B | | | | | S3 | S5 | S6 | S7 | S0 | S1 | 6 | 5 | 3 | 1 | 1 | 14 |
| $S3_{k-5} \to S2_k$ | (0, 1, 1, 1, x, 0, 0, 1, 1) | [14]9A | | | | | S3 | S4 | S5 | S6 | S8 | S2 | 7 | 7 | 5 | 4 | 4 | |
| | | [14]9B | | | | | S3 | S5 | S6 | S7 | S1 | S2 | 6 | 5 | 3 | 2 | 3 | 14 |
| $S7_{k-5} \to S6_k$ | (1, 0, 0, 0, x, 1, 1, 0, 0) | [14]10A | | | | | S7 | S1 | S2 | S3 | S5 | S6 | 2 | 3 | 5 | 6 | 5 | |
| | | [14]10B | | | | | S7 | S0 | S1 | S2 | S9 | S6 | 1 | 1 | 3 | 4 | 4 | 14 |
| $S7_{k-5} \to S5_k$ | (1, 0, 0, 0, x, 1, 1, 1, 0) | [14]11A | | | | | S7 | S1 | S2 | S3 | S4 | S5 | 2 | 3 | 5 | 7 | 7 | |
| | | [14]11B | | | | | S7 | S0 | S1 | S2 | S3 | S5 | 1 | 1 | 3 | 5 | 6 | 14 |
| $S7_{k-5} \to S4_k$ | (1, 0, 0, 0, x, 1, 1, 1, 1) | [14]12A | | | | | S7 | S1 | S2 | S3 | S4 | S4 | 2 | 3 | 5 | 7 | 8 | |
| | | [14]12B | | | | | S7 | S0 | S1 | S2 | S3 | S4 | 1 | 1 | 3 | 5 | 7 | 14 |
| $S6_{k-5} \to S6_k$ | (1, 1, 0, 0, x, 1, 1, 0, 0) | [14]13A | | | | | S6 | S8 | S2 | S3 | S5 | S6 | 4 | 4 | 5 | 6 | 5 | |
| | | [14]13B | | | | | S6 | S7 | S1 | S2 | S9 | S6 | 3 | 2 | 3 | 4 | 4 | 14 |
| $S6_{k-5} \to S5_k$ | (1, 1, 0, 0, x, 1, 1, 1, 0) | [14]14A | | | | | S6 | S8 | S2 | S3 | S4 | S5 | 4 | 4 | 5 | 7 | 7 | |
| | | [14]14B | | | | | S6 | S7 | S1 | S2 | S3 | S5 | 3 | 2 | 3 | 5 | 6 | 14 |
| $S6_{k-5} \to S4_k$ | (1, 1, 0, 0, x, 1, 1, 1, 1) | [14]15A | | | | | S6 | S8 | S2 | S3 | S4 | S4 | 4 | 4 | 5 | 7 | 8 | |
| | | [14]15B | | | | | S6 | S7 | S1 | S2 | S3 | S4 | 3 | 2 | 3 | 5 | 7 | 14 |
| $S4_{k-5} \to S0_k$ | (1, 1, 1, 1, x, 0, 0, 0, 0) | [14]16A | | | | | S4 | S4 | S5 | S6 | S7 | S0 | 8 | 7 | 5 | 3 | 1 | |
| | | [14]16B | | | | | S4 | S5 | S6 | S7 | S0 | S0 | 7 | 5 | 3 | 1 | 0 | 14 |
| $S4_{k-5} \to S1_k$ | (1, 1, 1, 1, x, 0, 0, 0, 1) | [14]17A | | | | | S4 | S4 | S5 | S6 | S7 | S1 | 8 | 7 | 5 | 3 | 2 | |
| | | [14]17B | | | | | S4 | S5 | S6 | S7 | S0 | S1 | 7 | 5 | 3 | 1 | 1 | 14 |
| $S4_{k-5} \to S2_k$ | (1, 1, 1, 1, x, 0, 0, 1, 1) | [14]18A | | | | | S4 | S4 | S5 | S6 | S8 | S2 | 8 | 7 | 5 | 4 | 4 | |
| | | [14]18B | | | | | S4 | S5 | S6 | S7 | S1 | S2 | 7 | 5 | 3 | 2 | 3 | 14 |

TABLE 2

| State transition | Transition data sequence $(b_{k-i}, \ldots, b_k)$ | Pattern | k−9 | k−8 | k−7 | k−6 | k−5 | k−4 | k−3 | k−2 | k−1 | k | PR equalization ideal value | | | | | Inter-path Euclidean distance |
|---|---|---|---|---|---|---|---|---|---|---|---|---|---|---|---|---|---|---|
| $S0_{k-7} \to S0_k$ | (0, 0, 0, 0, x, 1, !x, 0, 0, 0, 0) | [12A]1A | | | S0 | S1 | S2 | S9 | S6 | S7 | S0 | S0 | 1 | 3 | 4 | 4 | 3 | 0 | |
| | | [12A]1B | | | S0 | S0 | S1 | S2 | S9 | S6 | S7 | S0 | 0 | 1 | 3 | 4 | 4 | 3 | 1 | 12 |
| $S0_{k-7} \to S1_k$ | (0, 0, 0, 0, x, 1, !x, 0, 0, 0, 1) | [12A]2A | | | S0 | S1 | S2 | S9 | S6 | S7 | S0 | S1 | 1 | 3 | 4 | 4 | 3 | 1 | 1 | |
| | | [12A]2B | | | S0 | S0 | S1 | S2 | S9 | S6 | S7 | S1 | 0 | 1 | 3 | 4 | 4 | 3 | 2 | 12 |
| $S0_{k-7} \to S2_k$ | (0, 0, 0, 0, x, 1, !x, 0, 0, 1, 1) | [12A]3A | | | S0 | S1 | S2 | S9 | S6 | S7 | S1 | S2 | 1 | 3 | 4 | 4 | 3 | 2 | 3 | |
| | | [12A]3B | | | S0 | S0 | S1 | S2 | S9 | S6 | S8 | S2 | 0 | 1 | 3 | 4 | 4 | 4 | | 12 |
| $S2_{k-7} \to S6_k$ | (0, 0, 1, 1, x, 0, !x, 1, 1, 0, 0) | [12A]4A | | | S2 | S3 | S5 | S6 | S8 | S2 | S9 | S6 | 5 | 6 | 5 | 4 | 4 | 4 | | |
| | | [12A]4B | | | S2 | S9 | S6 | S8 | S2 | S3 | S5 | S6 | 4 | 4 | 4 | 5 | 6 | 5 | | 12 |
| $S2_{k-7} \to S5_k$ | (0, 0, 1, 1, x, 0, !x, 1, 1, 1, 0) | [12A]5A | | | S2 | S3 | S5 | S6 | S8 | S2 | S3 | S5 | 5 | 6 | 5 | 4 | 4 | 5 | 6 | |
| | | [12A]5B | | | S2 | S9 | S6 | S8 | S2 | S3 | S4 | S5 | 4 | 4 | 4 | 5 | 6 | 7 | 7 | 12 |
| $S2_{k-7} \to S4_k$ | (0, 0, 1, 1, x, 0, !x, 1, 1, 1, 1) | [12A]6A | | | S2 | S3 | S5 | S6 | S8 | S2 | S3 | S4 | 5 | 6 | 5 | 4 | 4 | 5 | 7 | |
| | | [12A]6B | | | S2 | S9 | S6 | S8 | S2 | S3 | S4 | S4 | 4 | 4 | 4 | 5 | 7 | 8 | | 12 |
| $S3_{k-7} \to S6_k$ | (0, 1, 1, 1, x, 0, !x, 1, 1, 0, 0) | [12A]7A | | | S3 | S4 | S5 | S6 | S8 | S2 | S9 | S6 | 7 | 7 | 5 | 4 | 4 | 4 | | |
| | | [12A]7B | | | S3 | S5 | S6 | S8 | S2 | S3 | S5 | S6 | 6 | 5 | 4 | 5 | 6 | 5 | | 12 |

TABLE 2-continued

| State transition | Transition data sequence $(b_{k-i}, \ldots, b_k)$ | Pattern | k−9 | k−8 | k−7 | k−6 | k−5 | k−4 | k−3 | k−2 | k−1 | k | PR equalization ideal value | | | | | | | | Inter-path Euclidean distance |
|---|---|---|---|---|---|---|---|---|---|---|---|---|---|---|---|---|---|---|---|---|---|
| $S3_{k-7} \to S5_k$ | (0, 1, 1, 1, x, 0, !x, 1, 1, 1, 0) | [12A]8A | | | S3 | S4 | S5 | S6 | S8 | S2 | S3 | S5 | 7 | 7 | 5 | 4 | 4 | 5 | 6 | |
| | | [12A]8B | | | S3 | S5 | S6 | S8 | S2 | S3 | S4 | S5 | 6 | 5 | 4 | 4 | 5 | 7 | 7 | 12 |
| $S3_{k-7} \to S4_k$ | (0, 1, 1, 1, x, 0, !x, 1, 1, 1, 1) | [12A]9A | | | S3 | S4 | S5 | S6 | S8 | S2 | S3 | S4 | 7 | 7 | 5 | 4 | 4 | 5 | 7 | |
| | | [12A]9B | | | S3 | S5 | S6 | S8 | S2 | S3 | S4 | S4 | 6 | 5 | 4 | 4 | 5 | 7 | 8 | 12 |
| $S7_{k-7} \to S0_k$ | (1, 0, 0, 0, x, 1, !x, 0, 0, 0, 0) | [12A]10A | | | S7 | S1 | S2 | S9 | S6 | S7 | S0 | S0 | 2 | 3 | 4 | 4 | 3 | 1 | 0 | |
| | | [12A]10B | | | S7 | S0 | S1 | S2 | S9 | S6 | S7 | S0 | 1 | 1 | 3 | 4 | 4 | 3 | 1 | 12 |
| $S7_{k-7} \to S1_k$ | (1, 0, 0, 0, x, 1, !x, 0, 0, 0, 1) | [12A]11A | | | S7 | S1 | S2 | S9 | S6 | S7 | S0 | S1 | 2 | 3 | 4 | 4 | 3 | 1 | 1 | |
| | | [12A]11B | | | S7 | S0 | S1 | S2 | S9 | S6 | S7 | S1 | 1 | 1 | 3 | 4 | 4 | 3 | 2 | 12 |
| $S7_{k-7} \to S2_k$ | (1, 0, 0, 0, x, 1, !x, 0, 0, 1, 1) | [12A]12A | | | S7 | S1 | S2 | S9 | S6 | S7 | S1 | S2 | 2 | 3 | 4 | 4 | 3 | 2 | 3 | |
| | | [12A]12B | | | S7 | S0 | S1 | S2 | S9 | S6 | S8 | S2 | 1 | 1 | 3 | 4 | 4 | 4 | 4 | 12 |
| $S6_{k-7} \to S0_k$ | (1, 1, 0, 0, x, 1, !x, 0, 0, 0, 0) | [12A]13A | | | S6 | S8 | S2 | S9 | S6 | S7 | S0 | S0 | 4 | 4 | 4 | 4 | 3 | 1 | 0 | |
| | | [12A]13B | | | S6 | S7 | S1 | S2 | S9 | S6 | S7 | S0 | 3 | 2 | 3 | 4 | 4 | 3 | 1 | 12 |
| $S6_{k-7} \to S1_k$ | (1, 1, 0, 0, x, 1, !x, 0, 0, 0, 1) | [12A]14A | | | S6 | S8 | S2 | S9 | S6 | S7 | S0 | S1 | 4 | 4 | 4 | 4 | 3 | 1 | 1 | |
| | | [12A]14B | | | S6 | S7 | S1 | S2 | S9 | S6 | S7 | S1 | 3 | 2 | 3 | 4 | 4 | 3 | 2 | 12 |
| $S6_{k-7} \to S2_k$ | (1, 1, 0, 0, x, 1, !x, 0, 0, 1, 1) | [12A]15A | | | S6 | S8 | S2 | S9 | S6 | S7 | S1 | S2 | 4 | 4 | 4 | 4 | 3 | 2 | 3 | |
| | | [12A]15B | | | S6 | S7 | S1 | S2 | S9 | S6 | S8 | S2 | 3 | 2 | 3 | 4 | 4 | 4 | 4 | 12 |
| $S4_{k-7} \to S6_k$ | (1, 1, 1, 1, x, 0, !x, 1, 1, 0, 0) | [12A]16A | | | S4 | S4 | S5 | S6 | S8 | S2 | S9 | S6 | 8 | 7 | 5 | 4 | 4 | 4 | 4 | |
| | | [12A]16B | | | S4 | S5 | S6 | S8 | S2 | S3 | S5 | S6 | 7 | 5 | 4 | 4 | 5 | 6 | 5 | 12 |
| $S4_{k-7} \to S5_k$ | (1, 1, 1, 1, x, 0, !x, 1, 1, 1, 0) | [12A]17A | | | S4 | S4 | S5 | S6 | S8 | S2 | S3 | S5 | 8 | 7 | 5 | 4 | 4 | 5 | 6 | |
| | | [12A]17B | | | S4 | S5 | S6 | S8 | S2 | S3 | S4 | S5 | 7 | 5 | 4 | 4 | 5 | 7 | 7 | 12 |
| $S4_{k-7} \to S4_k$ | (1, 1, 1, 1, x, 0, !x, 1, 1, 1, 1) | [12A]18A | | | S4 | S4 | S5 | S6 | S8 | S2 | S3 | S4 | 8 | 7 | 5 | 4 | 4 | 5 | 7 | |
| | | [12A]18B | | | S4 | S5 | S6 | S8 | S2 | S3 | S4 | S4 | 7 | 5 | 4 | 4 | 5 | 7 | 8 | 12 |

TABLE 3

| State transition | Transition data sequence $(b_{k-i}, \ldots, b_k)$ | Pattern | k−9 | k−8 | k−7 | k−6 | k−5 | k−4 | k−3 | k−2 | k−1 | k |
|---|---|---|---|---|---|---|---|---|---|---|---|---|
| $S0_{k-9} \to S6_k$ | (0, 0, 0, 0, x, 1, !x, 0, x, 1, 1, 0) | [12B]1A | S0 | S1 | S2 | S9 | S6 | S8 | S2 | S3 | S5 | S6 |
| | | [12B]1B | S0 | S0 | S1 | S2 | S9 | S6 | S8 | S2 | S9 | S6 |
| $S0_{k-9} \to S5_k$ | (0, 0, 0, 0, x, 1, !x, 0, x, 1, 1, 0) | [12B]2A | S0 | S1 | S2 | S9 | S6 | S8 | S2 | S3 | S4 | S5 |
| | | [12B]2B | S0 | S0 | S1 | S2 | S9 | S6 | S8 | S2 | S3 | S5 |
| $S0_{k-9} \to S4_k$ | (0, 0, 0, 0, x, 1, !x, 0, x, 1, 1, 1) | [12B]3A | S0 | S1 | S2 | S9 | S6 | S8 | S2 | S3 | S4 | S4 |
| | | [12B]3B | S0 | S0 | S1 | S2 | S9 | S6 | S8 | S2 | S3 | S4 |
| $S2_{k-7} \to S0_k$ | (0, 0, 1, 1, x, 0, !x, 1, x, 0, 0, 0, 0) | [12B]4A | | | S2 | S3 | S5 | S6 | S8 | S2 | S9 | S6 | S7 | S0 |
| | | [12B]4B | | | S2 | S9 | S6 | S8 | S2 | S9 | S6 | S7 | S0 | S0 |
| $S2_{k-7} \to S1_k$ | (0, 0, 1, 1, x, 0, !x, 1, x, 0, 0, 0, 1) | [12B]5A | | | S2 | S3 | S5 | S6 | S8 | S2 | S9 | S6 | S7 | S1 |
| | | [12B]5B | | | S2 | S9 | S6 | S8 | S2 | S9 | S6 | S7 | S0 | S1 |
| $S2_{k-7} \to S2_k$ | (0, 0, 1, 1, x, 0, !x, 1, x, 0, 0, 1, 1) | [12B]6A | | | S2 | S3 | S5 | S6 | S8 | S2 | S9 | S6 | S8 | S2 |
| | | [12B]6B | | | S2 | S9 | S6 | S8 | S2 | S9 | S6 | S7 | S1 | S2 |
| $S3_{k-5} \to S0_k$ | (0, 1, 1, 1, x, 0, !x, 1, x, 0, 0, 0, 0) | [12B]7A | | | S3 | S4 | S5 | S6 | S8 | S2 | S9 | S6 | S7 | S0 |
| | | [12B]7B | | | S3 | S5 | S6 | S8 | S2 | S9 | S6 | S7 | S0 | S0 |
| $S3_{k-5} \to S1_k$ | (0, 1, 1, 1, x, 0, !x, 1, x, 0, 0, 0, 1) | [12B]8A | | | S3 | S4 | S5 | S6 | S8 | S2 | S9 | S6 | S7 | S1 |
| | | [12B]8B | | | S3 | S5 | S6 | S8 | S2 | S9 | S6 | S7 | S0 | S1 |
| $S3_{k-5} \to S2_k$ | (0, 1, 1, 1, x, 0, !x, 1, x, 0, 0, 1, 1) | [12B]9A | | | S3 | S4 | S5 | S6 | S8 | S2 | S9 | S6 | S8 | S2 |
| | | [12B]9B | | | S3 | S5 | S6 | S8 | S2 | S9 | S6 | S7 | S1 | S2 |
| $S7_{k-5} \to S6_k$ | (1, 0, 0, 0, x, 1, !x, 0, x, 1, 1, 0, 0) | [12B]10A | | | S7 | S1 | S2 | S9 | S6 | S8 | S2 | S3 | S5 | S6 |
| | | [12B]10B | | | S7 | S0 | S1 | S2 | S9 | S6 | S8 | S2 | S9 | S6 |
| $S7_{k-5} \to S5_k$ | (1, 0, 0, 0, x, 1, !x, 0, x, 1, 1, 1, 0) | [12B]11A | | | S7 | S1 | S2 | S9 | S6 | S8 | S2 | S3 | S4 | S5 |
| | | [12B]11B | | | S7 | S0 | S1 | S2 | S9 | S6 | S8 | S2 | S3 | S5 |
| $S7_{k-5} \to S4_k$ | (1, 0, 0, 0, x, 1, !x, 0, x, 1, 1, 1, 1) | [12B]12A | | | S7 | S1 | S2 | S9 | S6 | S8 | S2 | S3 | S4 | S4 |
| | | [12B]12B | | | S7 | S0 | S1 | S2 | S9 | S6 | S8 | S2 | S3 | S4 |
| $S6_{k-5} \to S6_k$ | (1, 1, 0, 0, x, 1, !x, 0, x, 1, 1, 0, 0) | [12B]13A | | | S6 | S8 | S2 | S9 | S6 | S8 | S2 | S3 | S5 | S6 |
| | | [12B]13B | | | S6 | S7 | S1 | S2 | S9 | S6 | S8 | S2 | S9 | S6 |
| $S6_{k-5} \to S5_k$ | (1, 1, 0, 0, x, 1, !x, 0, x, 1, 1, 1, 0) | [12B]14A | | | S6 | S8 | S2 | S9 | S6 | S8 | S2 | S3 | S4 | S5 |
| | | [12B]14B | | | S6 | S7 | S1 | S2 | S9 | S6 | S8 | S2 | S3 | S5 |
| $S6_{k-5} \to S4_k$ | (1, 1, 0, 0, x, 1, !x, 0, x, 1, 1, 1, 1) | [12B]15A | | | S6 | S8 | S2 | S9 | S6 | S8 | S2 | S3 | S4 | S4 |
| | | [12B]15B | | | S6 | S7 | S1 | S2 | S9 | S6 | S8 | S2 | S3 | S4 |
| $S4_{k-5} \to S0_k$ | (1, 1, 1, 1, x, 0, !x, 1, x, 0, 0, 0, 0) | [12B]16A | | | S4 | S4 | S5 | S6 | S8 | S2 | S9 | S6 | S7 | S0 |
| | | [12B]16B | | | S4 | S5 | S6 | S8 | S2 | S9 | S6 | S7 | S0 | S0 |
| $S4_{k-5} \to S1_k$ | (1, 1, 1, 1, x, 0, !x, 1, x, 0, 0, 0, 1) | [12B]17A | | | S4 | S4 | S5 | S6 | S8 | S2 | S9 | S6 | S7 | S1 |
| | | [12B]17B | | | S4 | S5 | S6 | S8 | S2 | S9 | S6 | S7 | S0 | S1 |
| $S4_{k-5} \to S2_k$ | (1, 1, 1, 1, x, 0, !x, 1, x, 0, 0, 1, 1) | [12B]18A | | | S4 | S4 | S5 | S6 | S8 | S2 | S9 | S6 | S8 | S2 |
| | | [12B]18B | | | S4 | S5 | S6 | S8 | S2 | S9 | S6 | S7 | S1 | S2 |

| State transition | PR equalization ideal value | | | | | | | | | Inter-path Euclidean distance |
|---|---|---|---|---|---|---|---|---|---|---|
| $S0_{k-9} \to S6_k$ | 1 | 3 | 4 | 4 | 4 | 4 | 5 | 6 | 5 | |
| | 0 | 1 | 3 | 4 | 4 | 4 | 4 | 4 | 4 | 12 |
| $S0_{k-9} \to S5_k$ | 1 | 3 | 4 | 4 | 4 | 4 | 5 | 7 | 7 | |
| | 0 | 1 | 3 | 4 | 4 | 4 | 4 | 5 | 6 | 12 |

TABLE 3-continued

| State transition | | | | | | | | | | Distance |
|---|---|---|---|---|---|---|---|---|---|---|
| $S0_{k-9} \rightarrow S4_k$ | 1 | 3 | 4 | 4 | 4 | 4 | 5 | 7 | 8 | |
| | 0 | 1 | 3 | 4 | 4 | 4 | 4 | 5 | 7 | 12 |
| $S2_{k-7} \rightarrow S0_k$ | 5 | 6 | 5 | 4 | 4 | 4 | 4 | 3 | 1 | |
| | 4 | 4 | 4 | 4 | 4 | 4 | 3 | 1 | 0 | 12 |
| $S2_{k-7} \rightarrow S1_k$ | 5 | 6 | 5 | 4 | 4 | 4 | 4 | 3 | 2 | |
| | 4 | 4 | 4 | 4 | 4 | 4 | 3 | 1 | 1 | 12 |
| $S2_{k-7} \rightarrow S2_k$ | 5 | 6 | 5 | 4 | 4 | 4 | 4 | 4 | 4 | |
| | 4 | 4 | 4 | 4 | 4 | 4 | 3 | 2 | 3 | 12 |
| $S3_{k-5} \rightarrow S0_k$ | 7 | 7 | 5 | 4 | 4 | 4 | 4 | 3 | 1 | |
| | 6 | 5 | 4 | 4 | 4 | 4 | 3 | 1 | 0 | 12 |
| $S3_{k-5} \rightarrow S1_k$ | 7 | 7 | 5 | 4 | 4 | 4 | 4 | 3 | 2 | |
| | 6 | 5 | 4 | 4 | 4 | 4 | 3 | 1 | 1 | 12 |
| $S3_{k-5} \rightarrow S2_k$ | 7 | 7 | 5 | 4 | 4 | 4 | 4 | 4 | 4 | |
| | 6 | 5 | 4 | 4 | 4 | 4 | 3 | 2 | 3 | 12 |
| $S7_{k-5} \rightarrow S6_k$ | 2 | 3 | 4 | 4 | 4 | 4 | 5 | 6 | 5 | |
| | 1 | 1 | 3 | 4 | 4 | 4 | 4 | 4 | 4 | 12 |
| $S7_{k-5} \rightarrow S5_k$ | 2 | 3 | 4 | 4 | 4 | 4 | 5 | 7 | 7 | |
| | 1 | 1 | 3 | 4 | 4 | 4 | 4 | 5 | 6 | 12 |
| $S7_{k-5} \rightarrow S4_k$ | 2 | 3 | 4 | 4 | 4 | 4 | 5 | 7 | 8 | |
| | 1 | 1 | 3 | 4 | 4 | 4 | 4 | 5 | 7 | 12 |
| $S6_{k-5} \rightarrow S6_k$ | 4 | 4 | 4 | 4 | 4 | 4 | 5 | 6 | 5 | |
| | 3 | 2 | 3 | 4 | 4 | 4 | 4 | 4 | 4 | 12 |
| $S6_{k-5} \rightarrow S5_k$ | 4 | 4 | 4 | 4 | 4 | 4 | 5 | 7 | 7 | |
| | 3 | 2 | 3 | 4 | 4 | 4 | 4 | 5 | 6 | 12 |
| $S6_{k-5} \rightarrow S4_k$ | 4 | 4 | 4 | 4 | 4 | 4 | 5 | 7 | 8 | |
| | 3 | 2 | 3 | 4 | 4 | 4 | 4 | 5 | 7 | 12 |
| $S4_{k-5} \rightarrow S0_k$ | 8 | 7 | 5 | 4 | 4 | 4 | 4 | 3 | 1 | |
| | 7 | 5 | 4 | 4 | 4 | 4 | 3 | 1 | 0 | 12 |
| $S4_{k-5} \rightarrow S1_k$ | 8 | 7 | 5 | 4 | 4 | 4 | 4 | 3 | 2 | |
| | 7 | 5 | 4 | 4 | 4 | 4 | 3 | 1 | 1 | 12 |
| $S4_{k-5} \rightarrow S2_k$ | 8 | 7 | 5 | 4 | 4 | 4 | 4 | 4 | 4 | |
| | 7 | 5 | 4 | 4 | 4 | 4 | 3 | 2 | 3 | 12 |

In Tables 1 through 3, the first column represents the state transition ($Sm_{k-9} \rightarrow Sn_k$) by which two state transitions which are likely to cause an error are branched and rejoin.

The second column represents the state data sequence $b_{k-1}, \ldots, b_k$) which causes the corresponding state transition.

"X" in the demodulated data sequence represents a bit which is likely to cause an error in such data. When the corresponding state transition is determined to be an error, the number of X (also the number of !X) is the number of errors.

Among a transition data sequence in which X is 1 and a transition data sequence in which X is 0, one corresponds to a first state transition path having the maximum likelihood, and the other corresponds to a second state transition path having the second maximum likelihood.

In Tables 2 and 3, "!X" represents an inverted bit of X.

From the demodulated data sequences obtained by demodulation performed by a Viterbi decoding section, the first state transition path having the maximum likelihood of causing an error and the second state transition path having the second maximum likelihood of causing an error can be extracted by comparing each demodulated data sequence and the transition data sequence (X: Don't care).

The third column represents the first state transition path and the second state transition path.

The fourth column represents two ideal reproduction waveforms (PR equalization ideal values) after the respective state transitions. The fifth column represents the square of the Euclidean distance between the two ideal signals (inter-path Euclidean distance).

Among combination patterns of two possible state transitions, Table 1 shows 18 patterns by which the square of the Euclidean distance between the two possible state transitions is 14.

These patterns correspond to a portion of an optical disc medium at which a mark is switched to a space (edge of a waveform).

In other words, these patterns are 1-bit edge shift error patterns.

As an example, state transition paths from $S0(k-5)$ to $S6(k)$ in the state transition rule in FIG. 3 will be described.

In this case, one path in which the recording sequence is changed as "0,0,0,0,1,1,1,0,0" is detected. Considering that "0" of the reproduction data is a space and "1" of the reproduction data is a mark, this state transition path corresponds to a 4T or longer space, a 3T mark, and a 2T or longer space.

Figure 4:
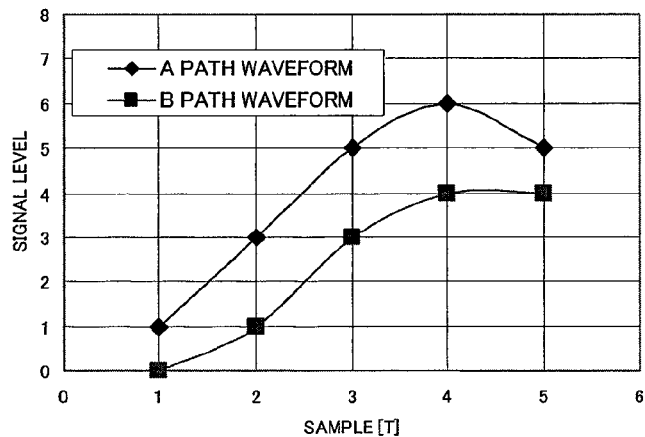
FIG. 4 shows PR equalization ideal waveforms shown in Table 1 according to the embodiment of the present invention.

FIG. 4 shows an example of the PR equalization ideal waveforms in the recording sequence shown in Table 1. In FIG. 4, "A path waveform" represents the PR equalization ideal waveform of the above-mentioned recording sequence.

Figure 5:
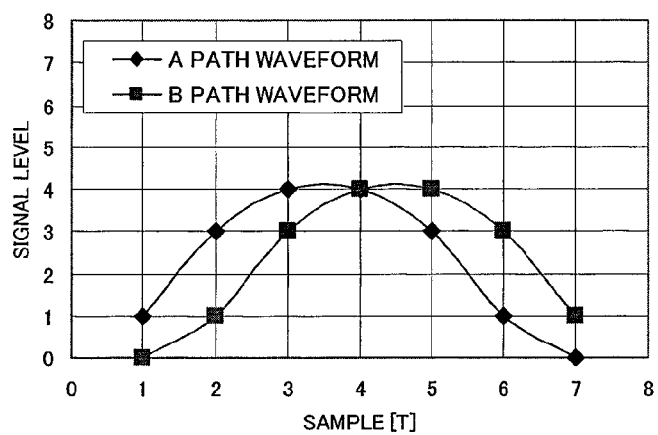
FIG. 5 is PR equalization ideal waveforms shown in Table 2 according to the embodiment of the present invention.

Similarly, FIG. 5 shows an example of the PR equalization ideal waveforms shown in Table 2.

Figure 6:
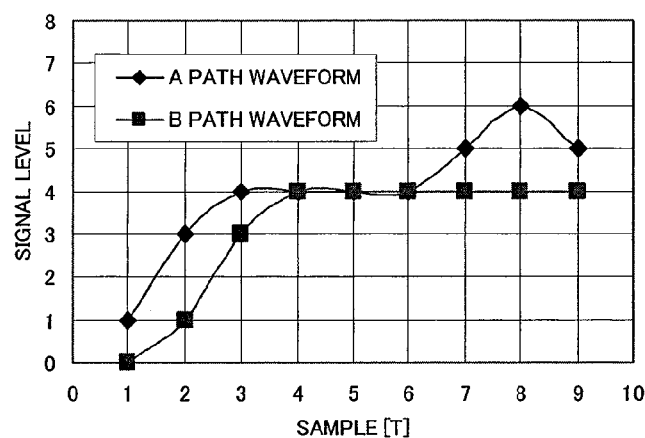
FIG. 6 is PR equalization ideal waveforms shown in Table 3 according to the embodiment of the present invention.

FIG. 6 shows an example of the PR equalization ideal waveforms shown in Table 3.

In FIGS. 4, 5 and 6, the horizontal axis represents the sampling time (sampled at one time unit of the recording sequence), and the vertical axis represents the reproduction signal level.

As described above, in PR12221ML, there are 9 ideal reproduction signal levels (level 0 through level 8).

In the state transition rule shown in FIG. 3, there is another path from $S0(k-5)$ to $S6(k)$, in which the recording sequence is changed as "0,0,0,0,0,1,1,0,0". Considering that "0" of the reproduction data is a space and "1" of the reproduction data is a mark, this state transition path corresponds to a 5T or longer space, a 2T mark, and a 2T or longer space.

In FIG. 4, "B path waveform" represents the PR equalization ideal waveform of this path.

The patterns shown in Table 1 corresponding to the square of the Euclidean distance of 14 have a feature of necessarily including one piece of edge information.

Table 2 shows 18 patterns by which the square of the Euclidean distance between the two possible state transitions is 12.

These patterns correspond to a shift error of a 2T mark or a 2T space; namely, are 2-bit shift error patterns.

As an example, state transition paths from S0(k−7) to S0(k) in the state transition rule in FIG. 3 will be described.

In this case, one path in which the recording sequence is changed as "0,0,0,0,1,1,0,0,0,0" is detected. Considering that "0" of the reproduction data is a space and "1" of the reproduction data is a mark, this state transition path corresponds to a 4T or longer space, a 2T mark, and a 5T or longer space.

In FIG. 5, "A path waveform" represents the PR equalization ideal waveform of this path.

There is another path in which the recording sequence is changed as "0,0,0,0,0,1,1,0,0,0,0". Considering that "0" of the reproduction data is a space and "1" of the reproduction data is a mark, this state transition path corresponds to a 5T or longer space, a 2T mark, and a 4T or longer space.

In FIG. 5, "B path waveform" represents the PR equalization ideal waveform of this path.

The patterns shown in Table 2 corresponding to the square of the Euclidean distance of 12 have a feature of necessarily including two pieces of edge information on a 2T rise and a 2T fall.

Table 3 also shows 18 patterns by which the square of the Euclidean distance between two possible state transitions is 12. The patterns in Table 3 is of a different type from the patterns in Table 2.

These patterns correspond to a portion at which a 2T mark is continuous to a 2T space; namely, are 3-bit error patterns.

As an example, state transition paths from S0(k−9) to S6(k) in the state transition rule in FIG. 3 will be described.

In this case, one path in which the recording sequence is changed as "0,0,0,0,1,1,0,0,1,1,0,0" is detected. Considering that "0" of the reproduction data is a space and "1" of the reproduction data is a mark, this state transition path corresponds to a 4T or longer space, a 2T mark, a 2T space, a 3T mark, and a 2T or longer space.

In FIG. 6, "A path waveform" represents the PR equalization ideal waveform of this path.

There is another path in which the recording sequence is changed as "0,0,0,0,0,1,1,0,0,1,1,0,0". Considering that "0" of the reproduction data is a space and "1" of the reproduction data is a mark, this state transition path corresponds to a 5T or longer space, a 2T mark, a 2T space, a 2T mark, and a 2T or longer space.

In FIG. 6, "B path waveform" represents the PR equalization ideal waveform of this path.

The patterns shown in Table 3 corresponding to the square of the Euclidean distance of 12 have a feature of including at least three pieces of edge information.

Even where the state transition path pattern includes 2T/2T ("shortest mark/shortest space" or "shortest space/shortest mark"), which is a 2T-continuous pattern, in a recording layer having a recording capacity of 25 GB, a signal amplitude fluctuation which is sufficient to distinguish an edge is obtained. However, in a high density recording layer having a recording capacity of 33.3 GB, as is clear from FIG. 6, the wavelength is almost flat in a 2T/2T portion. This indicates that a sufficient signal amplitude fluctuation is not obtained. As a result of accumulated studies, the present inventors found that in order to calculate a shift amount of the edge of the shortest mark of the 2T/2T portion, it is effective to provide, before or after the 2T/2T portion, a pattern including a 3T or longer mark or space to find a differential metric. Such a pattern is:

"shortest mark/shortest space/second shortest or longer mark" or

"second shortest or longer space/shortest mark/shortest space" or

"shortest space/shortest mark/second shortest or longer space" or

"second shortest or longer mark/shortest space/shortest mark".

Each of the above patterns, in other words, are one of the following: a pattern in which a shortest space is adjacent before or after a shortest mark and a space adjacent to the shortest mark and not adjacent to the shortest space is longer than the shortest space; or a pattern in which a shortest space is adjacent before or after a shortest mark and a mark adjacent to the shortest space and not adjacent to the shortest mark is longer than the shortest mark. Such a feature of the present invention will be further described later with reference to FIG. 14.

In this specification, the "shortest mark" or the "shortest space" may be occasionally referred to as the "shortest". For example, the expression "shortest/shortest" means that a "shortest space" is adjacent after a "shortest mark", or a "shortest mark" is adjacent after a "shortest space".

In addition, for example, the expression "○/second shortest or longer/shortest/shortest/△" means a data sequence in which the marks and/or spaces are sequentially arranged as follows:

a mark (or space) of any length,
a second shortest or longer space (or mark),
a shortest mark (or space),
a shortest space (or mark), and
a mark (or space) of any length.

The expression "second shortest" means a length which is shortest next to the "shortest", and is 3T herein. For example, a "second shortest or longer space" means a "3T or longer space".

Embodiment 1

Now, an Optical Disc Apparatus According to an embodiment of the present invention will be described.

FIG. 1 shows an optical disc apparatus 100 according to Embodiment 1 of the present invention.

The optical disc apparatus 100 reproduces information from an information recording medium 1 mounted thereon or records information to the information recording medium 1.

The information recording medium 1 is, for example, an optical disc medium.

The optical disc apparatus 100 includes an optical head section 2, a preamplifier section 3, an AGC (Automatic Gain Controller) section 4, a waveform equalization section 5, an A/D conversion section 6, a PLL section 7, a PR equalization section 8, a maximum likelihood decoding section 9, a signal evaluation index detection section 10, and an optical disc controller section 15.

The optical head section 2 includes an irradiation section for irradiating a track of the information recording medium with laser light and a light receiving section for receiving light reflected from the track. The preamplifier section 3, the AGC section 4, the waveform equalization section 5, the A/D conversion section 6, the PLL section 7, the PR equalization section 8, and the maximum likelihood decoding section 9 together act as a reproduction section for reproducing a data sequence based on the signal obtained by the received light.

The signal evaluation index detection section 10 includes a 14-pattern detection section 101, a 12A-pattern detection section 104 and a 12B-pattern detection section 107 for respectively detecting patterns corresponding to Table 1 (14-patterns), Table 2 (12A-patterns) and Table 3 (12B-patterns);

differential metric calculation sections 102, 105 and 108 for calculating a metric difference of each pattern; and memory sections 103, 106 and 109 for accumulating and storing a positional shift index of each pattern calculated by the differential metric calculation sections 102, 105 and 108.

The optical head section 2 converges laser light transmitted through an objective lens on a recording layer of the information recording medium 1, receives the reflected light, and generates an analog reproduction signal representing information recorded on the information recording medium 1. The numerical aperture of the objective lens is 0.7 to 0.9, and preferably is 0.85.

The laser light has a wavelength of 410 nm or shorter, preferably of 405 nm.

The preamplifier section 3 amplifies the analog reproduction signal at a prescribed gain and outputs the amplified analog reproduction signal to the AGC section 4.

The AGC section 4 amplifies the reproduction signal using a preset target gain, such that a reproduction signal output from the A/D conversion section 6 has a constant level, and outputs the reproduction signal to the waveform equalization section 5.

The waveform equalization section 5 has an LPF characteristic of shielding a high region of a reproduction signal and a filter characteristic of amplifying a prescribed frequency region of a reproduction signal, shapes the reproduction signal so as to have a desired characteristic and outputs the reproduction signal to the A/D conversion section 6.

The PLL circuit 7 generates a reproduction clock synchronized with the reproduction signal processed with waveform equalization and outputs the reproduction clock to the A/D conversion section 6.

The A/D conversion section 6 samples the reproduction signal in synchronization with the reproduction clock which is output from the PLL circuit 7, converts the analog reproduction signal to a digital reproduction signal, and outputs the digital reproduction signal to the PR equalization section 8, the PLL section 7 and the AGC section 4.

The PR equalization section 8 has, as a frequency characteristic of the reproduction system, a frequency characteristic which is set to be assumed by the maximum likelihood decoding section 9 (for example, PR(1,2,2,2,1) equalization characteristic), executes PR equalization processing of suppressing noise in a high region and adding an intentional inter-code interference on the reproduction signal, and outputs the resultant signal to the maximum likelihood decoding section 9.

The PR equalization section 8 may include an FIR (Finite Impulse Response) filter structure and adaptably control the tap coefficient using an LMS (The Least-Mean Square) algorithm (see Non-Patent Document No. 2 ("Adaptive Signal Processing Algorithm ("Tekioh Shingoshori Algorithm")" published by Baifukan, Co., Ltd.)).

The maximum likelihood decoding section 9 is, for example, a Viterbi decoder, and decodes the reproduction signal processed with PR equalization by the PR equalization section 8 using a maximum likelihood decoding method for estimating a path having the maximum likelihood based on the code rule intentionally added in accordance with the form of partial response, and outputs binary data.

The binary data is output to the optical disc controller 15 on a later stage as a demodulated binary signal and processed as prescribed. Thus, the information recorded on the information recording medium 1 is reproduced.

To the signal evaluation index detection section 10, the waveform-shaped digital reproduction signal output from the PR equalization section 8 and the binary signal output from the maximum likelihood decoding section 9.

The pattern detection sections 101, 104 and 107 compare the transition data sequences in Tables 1, 2 and 3 with the binary data. When the binary data matches the transition data sequences in Tables 1, 2 and 3, the pattern detection sections 101, 104 and 107 select a state transition path 1 having the maximum likelihood and a state transition path 2 having the second maximum likelihood based on Tables 1, 2 and 3.

Based on the selection results, the differential metric calculation sections 102, 105 and 108 calculate a metric, which is a distance between an ideal value of each state transition path (PR equalization ideal value; see Tables 1, 2 and 3) and the digital reproduction signal, and also calculate a difference between the metrics calculated on the two state transition matrices. Such a metric difference has a positive or a negative value, and therefore is subjected to absolute value processing.

Figure 7:
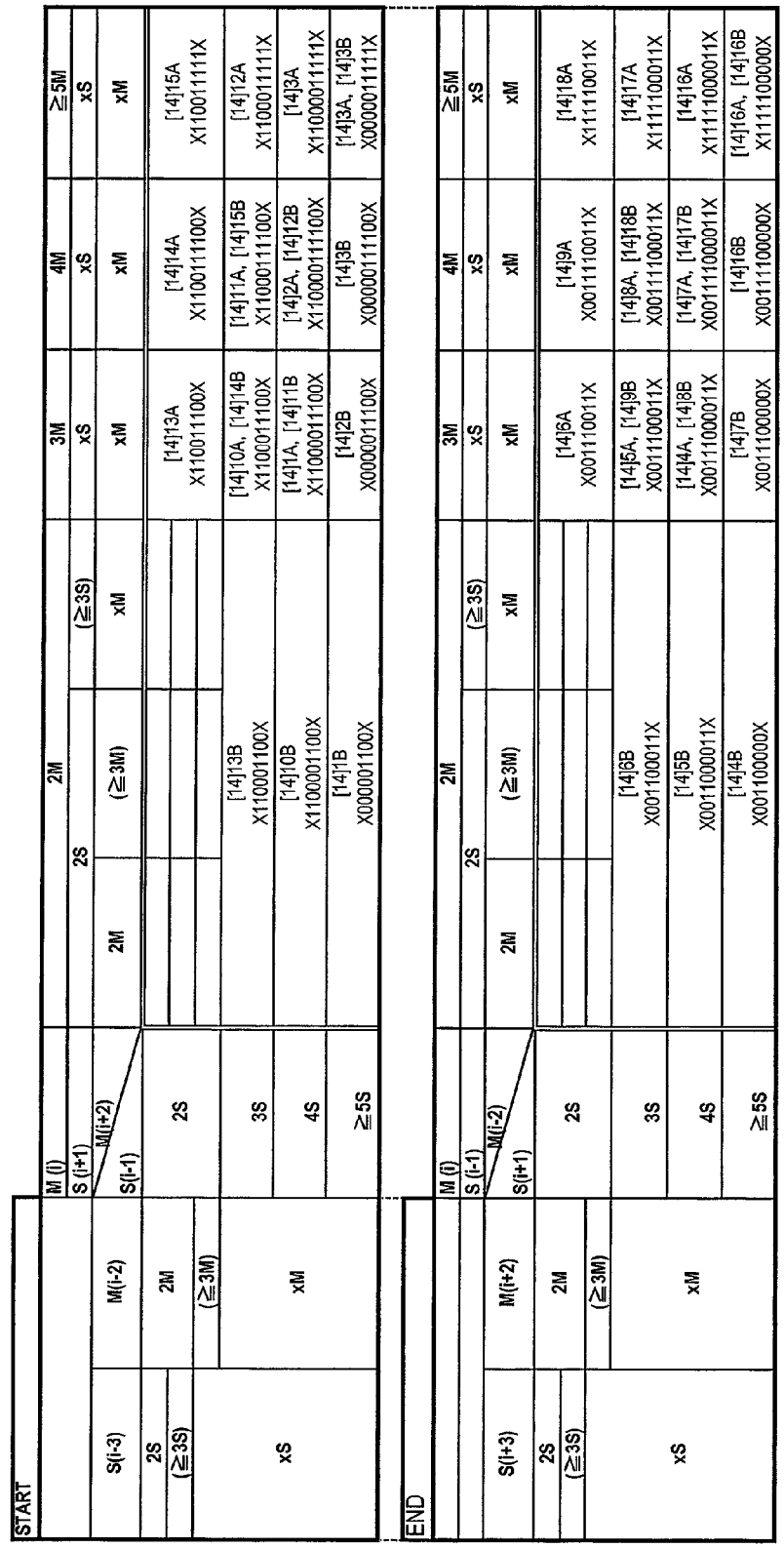
FIG. 7 shows classification into detailed patterns of differential metrics having a 14-detection pattern by PR(1,2,2,2,1) ML according to the embodiment of the present invention.

Based on the binary data, the pattern detection sections 101, 104 and 107 generate a pulse signal to be assigned to each of start edge/end edge patterns of the mark shown in FIGS. 7, 8 and 9, and output the pulse signal to the memory sections 103, 106 and 109.

Based on the pulse signal output from the pattern detection sections 101, 104 and 107, the memory sections 103, 106 and 109 accumulatively add the metric differences obtained by the differential metric calculation sections 102, 105 and 108 for each pattern shown in FIGS. 7, 8 and 9.

Now, the detailed pattern classification in FIGS. 7, 8 and 9 will be described in detail.

In FIGS. 7, 8 and 9, "M" represents a mark and "S" represents a space.

"i" represents time. For example, (2S(i−1), 3M(i), 4S(i+1)) means a 2T space is present before a 3T mark as the reference and a 4T space is present after the 3T mark.

In FIGS. 7, 8 and 9, pattern numbers correspond to the pattern numbers in Tables 1, 2 and 3.

For example, referring to Table 1, data sequence [14]1A has a transition data sequence (0,0,0,0,1,1,1,0,0). Where 0 represents a space and 1 represents a mark, this transition data sequence has a pattern of (4T or longer space, 3T mark, 2T or longer space).

This pattern corresponds to the cell of (wS(i−3), xM(i−2), 4S(i−1), 3M(i), yS(i+1), zM(i+2)) in FIG. 7.

Each of w, x, y and z may be any numerical value representing the length which a mark or a space can have.

For example, in the case of the RLL(1, 7) recording code, each of w, x, y and z may be any value of 2 to 9.

By the detailed pattern classification of the 14-detection patterns in FIG. 7, one edge shift of one space and one mark is classified. The "start" of a 14-detection pattern indicates an edge shift of a mark at time i and a space at time i−1. The "end" of a 14-detection pattern indicates an edge shift of a mark at time i and a space at time i+1.

By the detailed pattern classification of the 12A-detection patterns in FIG. 8, a shift of a 2T mark or a 2T space in a 14-detection pattern shown in FIG. 7 is further classified by the mark or space at the immediately previous time or the immediately subsequent time.

In the "start" of the 12A-detection pattern, a shift of a 2T mark at time i sandwiched between a space at time i−1 and a space at time i+1 is classified by the length of the space at time i+1, or a shift of a 2T space at time i−1 sandwiched between a mark at time i and a mark at time i−2 is classified by the length of the mark at time i−2.

In the "end" of the 12A-detection pattern, a shift of a 2T mark at time i sandwiched between a space at time i−1 and a space at time i+1 is classified by the length of the space at time i−1, or a shift of a 2T space at time i+1 sandwiched between a mark at time i and a mark at time i+2 is classified by the length of the mark at time i+2.

Finally, by the detailed pattern classification of the 12A-detection patterns in FIG. 9, a shift of continuous 2T mark and 2T space in a 12A-detection pattern shown in FIG. 8 is further classified by the mark or space at the further immediately previous time or the further immediately subsequent time. Namely, a shift of a 2T mark and a 2T space located in succession and sandwiched between one mark and one space is classified.

In the "start" of the 12B-detection pattern, a shift of a 2T mark at time i and a 2T space at time i+1 sandwiched between a mark at time i+2 and a space at time i−1 is classified by the length of the mark at time i+2, or a shift of a 2T mark at time i−2 and a 2T space at time i−1 sandwiched between a space at time i−3 and a mark at time i is classified by the length of the space at time i−3.

In the "end" of the 12B-detection pattern, a shift of a 2T mark at time i and a 2T space at time i−1 sandwiched between a space at time i+1 and a mark at time i−2 is classified by the length of the mark at time i−2, or a shift of a 2T space at time i+1 and a 2T mark at time i+2 sandwiched between a mark at time i and a space at time i+3 is classified by the length of the space at time i+3.

In FIG. 7, FIG. 8 and FIG. 9, the bit sequence represented by "x", "0" and "1" below each classification pattern represents the data sequence corresponding to the respective pattern. Herein, "0" represents binary data corresponding to a space in the data sequence, and "1" represents binary data corresponding to a mark in the data sequence. Where the reference cycle of the data sequence is T, one "0" represents binary data corresponding to a 1T space, and one "1" represents binary data corresponding to a 1T mark. "x" represents "0" or "1".

The binary data of the above-described pattern (pattern in which a shortest space is adjacent before or after a shortest mark and a space adjacent to the shortest mark and not adjacent to the shortest space is longer than the shortest space) is represented as, for example, "x000110011x" or "x110011000x".

The binary data of the above-described pattern (pattern in which a shortest space is adjacent before or after a shortest mark and a mark adjacent to the shortest space and not adjacent to the shortest mark is longer than the shortest mark) is represented as, for example, "x001100111x" or "x111001100x".

The operation of recognizing a prescribed pattern from binary data in this manner is executed by the pattern detection sections 101, 104 and 107. For example, for detecting the 12B-detection pattern, the pattern detection section 107 recognizes, based on the binary data, a pattern, included in the data sequence, including a first mark, a first space adjacent before or after the first mark, and a second mark not adjacent to the first mark and adjacent to the first space. When the first space and the second mark each have a length equal to or shorter than a prescribed length, the pattern detection section 107 recognizes whether or not a second space not adjacent to the first mark and adjacent to the second mark is longer than the prescribed length. When the second space is longer than the prescribed length, the pattern detection section 107 detects the 12B-detection pattern. The prescribed length is, for example, 2T, but is not limited to this.

In another example, for detecting the 12B-detection pattern, the pattern detection section 107 recognizes, based on the binary data, a pattern, included in the data sequence, including a first mark a first space adjacent before or after the first mark, and a third space not adjacent to the first space and adjacent to the first mark. When the first mark and the third space each have a length equal to or shorter than a prescribed length, the pattern detection section 107 recognizes whether or not a third mark not adjacent to the first space and adjacent to the third space is longer than the prescribed length. When the third mark is longer than the prescribed length, the pattern detection section 107 detects the 12B-detection pattern.

When the 12B-detection pattern is detected based on the binary signal as in this example, a first state transition path having the maximum likelihood and a second state transition path having the second maximum likelihood are selected from the 12B-detection pattern. The differential metric calculation section 108 calculates a differential metric using the first and second state transition matrices and a digital reproduction signal. Using the calculation result of the differential metric, the quality of the reproduction signal can be evaluated. For example, the quality of the digital reproduction signal can be evaluated by calculating a shift amount of the edge of, the shortest mark of the 2T/2T portion described above.

Hereinafter, a process for evaluating the quality of a reproduction signal (recording quality) will be described in detail.

In order to provide a signal evaluation index having a higher correlation with an error rate, an evaluation method considering all the patterns having a high likelihood of causing an error in the PR12221ML signal processing is required.

Figure 10:
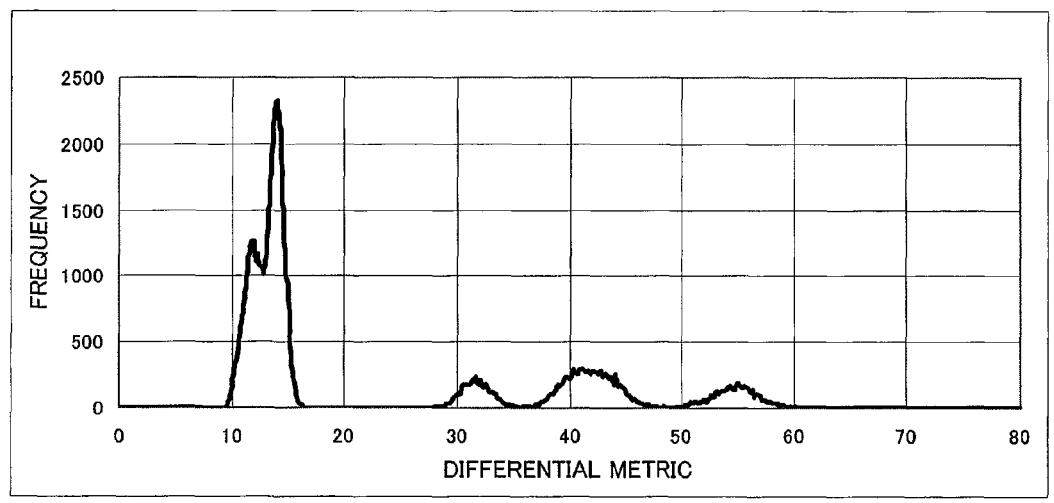
FIG. 10 shows a differential metric distribution by PR(1,2,2,2,1)ML according to the embodiment of the present invention.

FIG. 10 shows a distribution of differential metrics in the PR12221ML signal processing.

The horizontal axis represents the square of the Euclidean distance, and the vertical axis represents the frequency.

FIG. 10 shows that as the square of the Euclidean distance of the distribution is smaller, the likelihood of causing an error in the PR12221ML signal processing is higher.

It is seen from this figure that the distribution has highly dense groups at the square of the Euclidean distance of 12 and 14, and in the range of the square of the Euclidean distance above 14, the differential metrics are present only at 30 or higher.

Namely, it is appreciated that in order to provide a signal index having a high correlation with the error rate, it is sufficient to pay attention to the groups at the square of the Euclidean distance of 12 and 14.

These groups correspond to the patterns shown in Table 1 and Tables 2 and 3.

The pattern detection sections 101, 104 and 107 identify these patterns.

Hereinafter, an operation of the differential metric calculation sections for calculating a metric difference from the identified patterns will be described in further detail.

A binary signal is generated from a reproduction signal reproduced from the disc by the PRML processing.

From the binary signal, any of the patterns of the transition data sequences in Table 1 is detected. Thus, the PR equalization ideal values of the state transition matrices 1 and 2 are determined.

For example, it is assumed that in Table 1, (0,0,0,0,X,1,1,0,0) is demodulated as a binary signal. In this case, as the state transition path 1 having the maximum likelihood, data sequence [14]1A(S0, S1, S2, S3, S5, S6) is selected. As the state transition path 2 having the second maximum likelihood, data sequence [14]1B(S0, S0, S1, S2, S9, S6) is selected.

The PR equalization ideal value for the state transition path 1 is (1,3,5,6,5).

The PR equalization ideal value for the state transition path 2 is (0,1,3,4,4).

Next, the square of the difference between the reproduction signal sequence and the PR equalization ideal value for the state transition path 1 is found and labeled Pa. Similarly, the square of the difference between the reproduction signal sequence and the PR equalization ideal value for the state transition path 2 is found and labeled Pb. The absolute value of the difference between Pa and Pb is the differential metric $D_{14}=|Pa_{14}-Pb_{14}|$.

This processing is performed by the differential metric calculation sections.

The calculation of $Pa_{14}$ is represented by expression (1). The calculation of $Pb_{14}$ is represented by expression (2).

In the expressions, $a_k$ is the PR equalization ideal value for the state transition path 1, $b_k$ is the PR equalization ideal value for the state transition path 2, and $y_k$ is the reproduction signal sequence.

$$Pa_{14} = \sum_{k=k-5}^{k} (y_k - a_k)^2 \quad \text{expression (1)}$$

$$Pb_{14} = \sum_{k=k-5}^{k} (y_k - b_k)^2 \quad \text{expression (2)}$$

$$D_{14} = |Pa_{14} - Pb_{14}| \quad \text{expression (3)}$$

Figure 11:
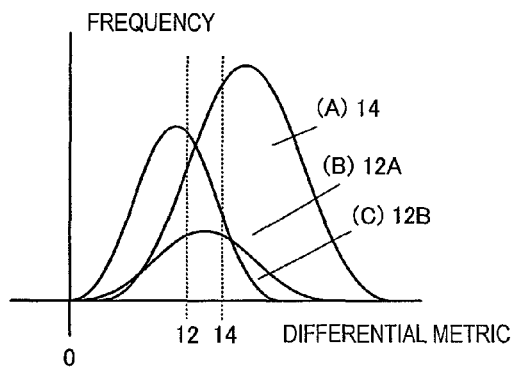
FIG. 11 shows a differential metric distribution of each Euclidean distance pattern by PR(1,2,2,2,1)ML according to the embodiment of the present invention.

In FIG. 11, (A) represents an output frequency distribution of the differential metric calculation section 102.

Similarly, outputs from the differential metric calculation section 105 are represented by expressions (4) through (6), and outputs from the differential metric calculation section 108 are represented by expressions (7) through (9).

$$Pa_{12A} = \sum_{k=k-7}^{k} (y_k - a_k)^2 \quad \text{expression (4)}$$

$$Pb_{12A} = \sum_{k=k-7}^{k} (y_k - b_k)^2 \quad \text{expression (5)}$$

$$D_{12A} = |Pa_{12A} - Pb_{12A}| \quad \text{expression (6)}$$

$$Pa_{12B} = \sum_{k=k-9}^{k} (y_k - a_k)^2 \quad \text{expression (7)}$$

$$Pb_{12B} = \sum_{k=k-9}^{k} (y_k - b_k)^2 \quad \text{expression (8)}$$

$$D_{12B} = |Pa_{12B} - Pb_{12B}| \quad \text{expression (9)}$$

In FIG. 11, (B) represents an output frequency distribution of the differential metric calculation section 105, and (C) represents an output frequency distribution of the differential metric calculation section 108.

The distributions represented by (A), (B) and (C) in FIG. 11 are different in the frequency and the center position as well as in the number of error bits generated when the respective pattern causes an error.

In the patterns in Table 1 corresponding to the square of the Euclidean distance of 14, a 1-bit error is generated. In the patterns in Table 2 corresponding to the square of the Euclidean distance of 12, a 2-bit error is generated. In the patterns in Table 3 corresponding to the square of the Euclidean distance of 12, a 3- or greater bit error is generated.

Especially, the number of error bits of the patterns in Table 3 depends on the number of successive 2T marks/spaces. For example, in the case of a recording modulation code permitted to include 6 successive marks/spaces at the maximum, a 6-bit error is generated at the maximum.

Table 3 does not show 6-bit errors, but a pattern causing a 6-bit error may be obtained by expanding the pattern including successive 2T marks/spaces.

The pattern causing a 6-bit error is omitted in this embodiment.

Now, a method for classifying each detection pattern into a detailed pattern using the above-described differential metric calculation will be described.

Figure 12:
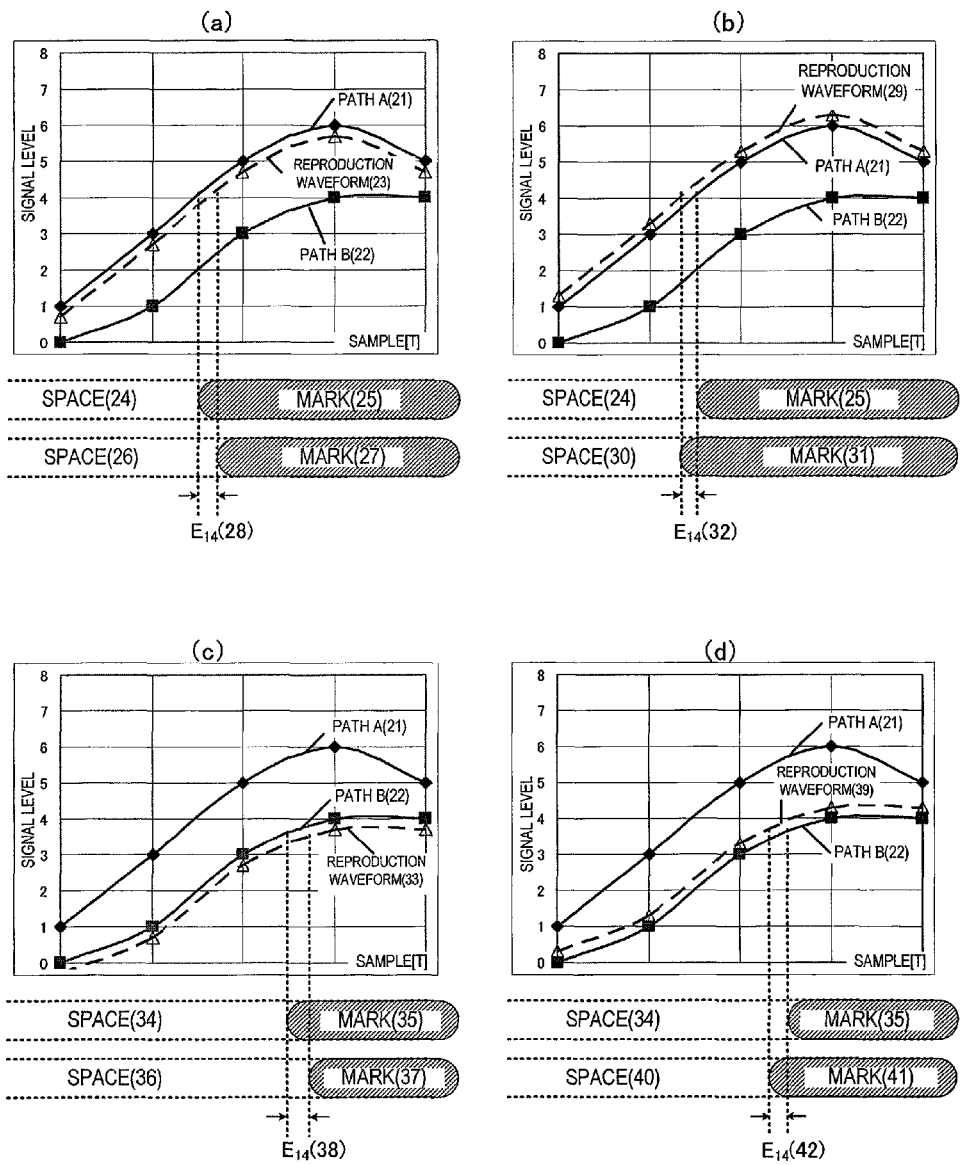
FIG. 12 shows examples of correlation of PR equalization ideal waveforms/reproduction waveform and a shift of marks regarding the 14-detection pattern shown in Table 1 according to the embodiment of the present invention.

FIG. 12 shows the correlation between the reproduction waveform and the shift of the mark of a pattern shown in FIG. 4, which are provided as an example of the 14-pattern.

In FIG. 12(*a*), a path A21 is a state transition path having the maximum likelihood, and a path B22 is a state transition path having the second maximum likelihood.

A reproduction waveform 23 represented by the dashed line with white triangles represents a waveform of data, of the information recording medium, having a signal which is slightly closer to the path B22 with respect to the path A21 as the reference.

A space 24 and a mark 25 respectively represent the ideal positions of the space and the mark of path A21, which is the state transition path having the maximum likelihood. A space 26 and a mark 27 respectively represent the positions of the space and the mark at which the reproduction waveform 23 is obtained.

The signal levels of the reproduction waveform 23 at sampling points $(y_{k-4}, y_{k-3}, y_{k-2}, y_{k-1}, y_k)$ are (0.7, 2.7, 4.7, 5.7, 4.7).

At this point, the signal levels of the path A21 and the path B22 are $a_k=(1,3,5,6,5)$ and $b_k=(0,1,3,4,4)$.

From the above-mentioned signal levels and expressions (1) and (2), the distance $Pa_{14}$ between the reproduction waveform 23 and the path A21 and the distance $Pb_{14}$ between the reproduction waveform 23 and the path B22 are found as expressions (10) and (11).

$$Pa_{14}=(0.7-1)^2+(2.7-3)^2+(4.7-5)^2+(5.7-6)^2+(4.7-5)^2\times 0.45 \quad \text{expression (10)}$$

$$Pb_{14}(0.7-0)^2+(2.7-1)^2+(4.7-3)^2+(5.7-4)^2+(4.7-4)^2\times 9.65 \quad \text{expression (11)}$$

From expression (3), the differential metric $D_{14}$ is found as expression (12).

$$D_{14}=|Pa_{14}-Pb_{14}|=|0.45-9.65|=9.2 \quad \text{expression (12)}$$

Where the distance between the path A and the path B is $Pstd_{14}$, $Pstd_{14}$ is the value of $Pb_{14}$ at which $Pa_{14}=0$, i.e., $Pstd_{14}$ is 14.

A shift amount $E_{14}$ of the reproduction waveform from the path A21, which is the state transition path having the maximum likelihood, is obtained by expression (13) below.

$$E_{14}=D_{14}-Pstd_{14}=9.2-14=-4.8 \quad \text{expression (13)}$$

The absolute value of $E_{14}$ obtained from expression (13) is the shift amount, and the sign thereof is the shifting direction.

Now, the shifting direction represented by the sign of $E_{14}$ will be described.

Similarly to the above, in FIG. 12(*b*), a reproduction waveform 29 represented by the dashed line with white triangles has a signal level which is farther from the path B22 with respect to the path A21 as the reference.

Where the signal levels of the reproduction waveform 29 $(y_{k-4}, y_{k-3}, y_{k-2}, y_{k-1}, y_k)$ are (1.3, 3.3, 5.3, 6.3, 5.3), $E_{14}(32)=4.8$.

FIGS. 12(c) and (d) each show a case where the path B22 represents the state transition path having the maximum likelihood.

In FIG. 12(c), a reproduction waveform 33 represented by the dashed line with white triangles has a signal level which is farther from the path A21 with respect to the path B22 as the reference. In FIG. 12(d), a reproduction waveform 39 represented by the dashed line with white triangles has a signal level which is slightly closer to the path A21 with respect to the path B22 as the reference.

Where the signal levels of the reproduction waveforms 33 and 39 $(y_{k-4}, y_{k-3}, y_{k-2}, y_{k-1}, y_k)$ are (0,0.7,2.7,3.7,3.7) and (0.3, 1.3,3.3,4.3,4.3), $E_{14}(38)=4.2$ and $E_{14}(42)=-4.8$.

From the above, when the reproduction waveform has a signal level which is closer to the state transition path having the second maximum likelihood with respect to the state transition path having the maximum likelihood, the sign of the $E_{14}$ value is negative. When the reproduction waveform has a signal level which is farther from the state transition path having the second maximum likelihood with respect to the state transition path having the maximum likelihood, the sign of the $E_{14}$ value is positive.

Figure 13:
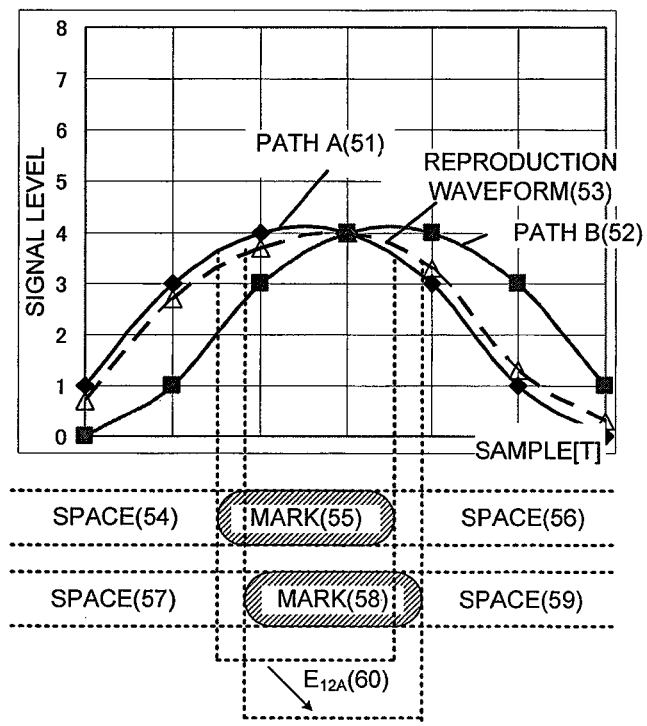
FIG. 13 shows an example of correlation between PR equalization ideal waveforms/reproduction waveform and a shift of marks regarding the 12A-detection pattern shown in Table 2 according to the embodiment of the present invention.

FIG. 13 shows the correlation between the reproduction waveform and the shift of the mark of a pattern shown in FIG. 5, which is provided as an example of the 12A-pattern.

In FIG. 13, a path A51 is a state transition path having the maximum likelihood, and a path B52 is a state transition path having the second maximum likelihood.

A reproduction waveform 53 represented by the dashed line with white triangles represents a waveform of data, of the information recording medium, having a signal which is slightly closer to the path B52 with respect to the path A51 as the reference.

Spaces 54 and 56 and a mark 55 respectively represent the ideal positions of the spaces and the mark of path A51, which is the state transition path having the maximum likelihood. Spaces 57 and 59 and a mark 58 respectively represent the positions of the spaces and the mark at which the reproduction waveform 53 is obtained.

The signal levels of the reproduction waveform 53 at sampling points $(y_{k-6}, y_{k-5}, y_{k-4}, y_{k-3}, y_{k-2}, y_{k-1}, y_k)$ are (0.7,2.7,3.7,4, 3.3,1.3,0.3).

At this point, the signal levels of the path A51 and the path B52 are $a_k$=(1,3,4,4,3,1,0) and $b_k$=(0,1,3,4,4,3,1).

From the above-mentioned signal levels and expressions (1) and (2), the distance $Pa_{12A}$ between the reproduction waveform 53 and the path A51 and the distance $Pb_{12A}$ between the reproduction waveform 53 and the path B52 are found as expressions (14) and (15).

$$Pa_{12A} = (0.7-1)^2 + (2.7-3)^2 + (3.7-4)^2 +$$
$$(4-4)^2 + (3.3-3)^2 + (1.3-1)^2 +$$
$$(0.3-0)^2$$
$$= 0.54$$
expression (14)

$$Pb_{12A} = (0.7-0)^2 + (2.7-1)^2 + (3.7-3)^2 +$$
$$(4-4)^2 + (3.3-4)^2 + (1.3-3)^2 +$$
$$(0.3-1)^2$$
$$= 7.74$$
expression (15)

From expression (3), the differential metric $D_{12A}$ is found as expression (16).

$$D_{12A}=|Pa_{12A}-Pb_{12A}|=|0.54-7.74|=7.2 \quad \text{expression (16)}$$

Where the distance between the path A and the path B is $Pstd_{12A}$, $Pstd_{12A}$ is the value of $Pb_{12A}$ at which $Pa_{12A}=0$, i.e., $Pstd_{12A}$ is 12.

A shift amount $E_{12A}$ of the reproduction waveform from the path A51, which is the state transition path having the maximum likelihood, is obtained by expression (17) below.

$$E_{12A}=D_{12A}-Pstd_{12A}=7.2-12=-4.8 \quad \text{expression (17)}$$

In the case of the 12A-pattern, as in the case of the 14-pattern, when the reproduction waveform has a signal level which is closer to the state transition path having the second maximum likelihood with respect to the state transition path having the maximum likelihood, the sign of the $E_{12A}$ value is negative. When the reproduction waveform has a signal level which is farther from the state transition path having the second maximum likelihood with respect to the state transition path having the maximum likelihood, the sign of the $E_{12A}$ value is positive.

In the example of FIG. 13, the mark 55 and the mark 58 are described as having the same length. The shift in the 12A-pattern is also applicable to a case where the ideal mark and the mark of the reproduction waveform have different lengths.

Figure 14:
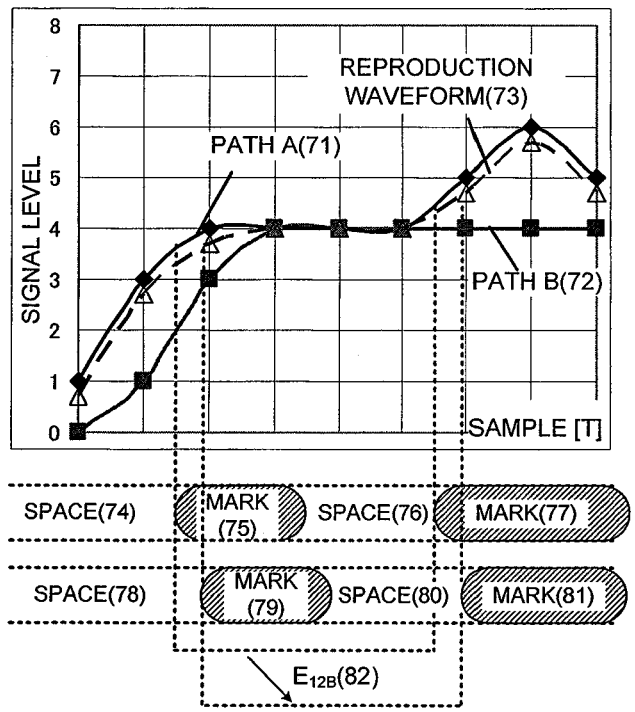
FIG. 14 shows an example of correlation between PR equalization ideal waveforms/reproduction waveform and a shift of marks regarding the 12B-detection pattern shown in Table 3 according to the embodiment of the present invention.

FIG. 14 shows the correlation between the reproduction waveform and the shift of the mark of a pattern shown in FIG. 6, which are provided as an example of the 12B-pattern.

In FIG. 14, a path A71 is a state transition path having the maximum likelihood, and a path B72 is a state transition path having the second maximum likelihood.

A reproduction waveform 73 represented by the dashed line with white triangles represents a waveform of data, of the information recording medium, having a signal which is slightly closer to the path B72 with respect to the path A71 as the reference.

Spaces 74 and 76 and marks 75 and 77 respectively represent the ideal positions of the spaces and the marks of path A71, which is in the state transition path having the maximum likelihood. Spaces 78 and 80 and marks 79 and 81 respectively represent the positions of the spaces and the marks at which the reproduction waveform 73 is obtained.

The signal levels of the reproduction waveform 73 at sampling points $(y_{k-8}, y_{k-7}, y_{k-6}, y_{k-5}, y_{k-4}, y_{k-3}, y_{k-2}, y_{k-1}, y_k)$ are (0.7, 2.7,3.7,4,4,4,4.7,5.7,4.7).

At this point, the signal levels of the path A71 and the path B72 are $a_k$=(1,3,4,4,4,4,5,6,5) and $b_k$=(0,1,3,4,4,4,4,4,4).

From the above-mentioned signal levels and expressions (1) and (2), the distance $Pa_{12B}$ between the reproduction waveform 73 and the path A71 and the distance $Pb_{12B}$ between the reproduction waveform 73 and the path B72 are found as expressions (18) and (19).

$$Pa_{12b} = (0.7-1)^2 + (2.7-3)^2 + (3.7-4)^2 +$$
$$(4-4)^2 + (4-4)^2 + (4-4)^2 +$$
$$(4.7-5)^2 + (5.7-6)^2 + (4.7-5)^2$$
$$= 0.54$$
expression (18)

$$Pb_{12b} = (0.7-0)^2 + (2.7-1)^2 + (3.7-4)^2 +$$
$$(4-4)^2 + (4-4)^2 + (4-4)^2 + (4.7-4)^2 +$$
$$(5.7-4)^2 + (4.7-4)^2$$
$$= 7.74$$
expression (19)

From expression (3), the differential metric $D_{in}$ is found as expression (20).

$$D_1=|Pa_{12B}-Pb_{12B}|=|0.54-7.74|=72 \quad \text{expression (20)}$$

Where the distance between the path A and the path B is $Pstd_{12B}$, $Pstd_{12B}$ is the value of $Pb_{12B}$ at which $Pa_{12B}=0$, i.e., $Pstd_{12B}$ is 12.

A shift amount $E_{12B}$ of the reproduction waveform from the path A71, which is the state transition path having the maximum likelihood, is obtained by expression (21) below.

$$E_{12B}=D_{12B}-Pstd_{12B}=7.2-12=-4.8 \qquad \text{expression (21)}$$

In the case of the 12B-pattern, as in the case of the 14-pattern, when the reproduction waveform has a signal level which is closer to the state transition path having the second maximum likelihood with respect to the state transition path having the maximum likelihood, the sign of the $E_{12B}$ value is negative. When the reproduction waveform has a signal level which is farther from the state transition path having the second maximum likelihood with respect to the state transition path having the maximum likelihood, the sign of the $E_{12B}$ value is positive.

In the example of FIG. 14, the mark 75 and the space 76 are described as having the same lengths as the mark 79 and the space 80. The shift in the 12B-pattern is also applicable to a case where the ideal mark or space and the mark or space of the reproduction waveform have different lengths.

As described above with reference to FIG. 6 and also understood from FIG. 14, where the state transition path includes a 2T/2T portion, which is a 2T-continuous pattern, a sufficient signal amplitude fluctuation is not obtained in the 2T/2T portion. In order to calculate a shift amount of the edge of the shortest mark of 2T/2T portion, it is effective to provide, before or after the 2T/2T portion, a pattern including a 3T or longer mark or space to find a differential metric. Such a pattern is:

"shortest mark/shortest space/second shortest or longer mark" or

"second shortest or longer space/shortest mark/shortest space" or

"shortest space/shortest mark/second shortest or longer space" or

"second shortest or longer mark/shortest space/shortest mark".

More specifically, the path A is represented as "4T or longer space (74)/2T mark (75)/2T space (76)/3T mark (77)/2T or longer space", which includes a 2T-continuous portion. In such a path A, the shift amount of the edge of the shortest mark (2T mark (75)) can be obtained by calculating a differential metric of the pattern of "4T or longer space (74)/2T mark (75)/2T space (76)". The "pattern of 4T or longer space (74)/2T mark (75)/2T space (76)" corresponds to a "pattern including a 3T or longer mark or space before or after 2T/2T".

The path B is represented as "5T or longer space/2T mark/2T space/2T mark/2T or longer space", which includes a 2T-continuous portion. In such a path B, the shift amount of the edge of the shortest mark (2T mark) can be obtained by calculating a differential metric of the pattern of "5T or longer space/2T mark/2T space". The "pattern of 5T or longer space/2T mark/2T space" corresponds to a "pattern including a 3T or longer mark or space before or after 2T/2T".

As described above with reference to FIG. 6, a pattern corresponding to the square of the Euclidean distance of 12 includes at least three pieces of edge information. Namely, calculating the shift amount of the edge of the shortest mark using the pattern of "○/second shortest or longer/shortest/shortest/Δ" or "○/shortest/shortest/second shortest or longer/Δ" is applicable to the 12A pattern in substantially the same manner as to the 12B pattern.

In the above example, a pattern including a shortest-continuous (e.g., 2T-continuous) portion is described as an example of a pattern by which a sufficient signal amplitude fluctuation is not obtained. Depending on the relationship with the recording density or the size of a spot diameter described later, a 2T-continuous pattern may not necessarily be the only pattern by which a sufficient signal amplitude fluctuation is not obtained. In such a case, it may be recognized whether or not the data sequence of interest includes a portion including a mark and a space continuously both having a length equal to or shorter than the length at which a sufficient signal amplitude fluctuation is not obtained (a portion having a mark of a prescribed length or shorter and a space of the prescribed length or shorter continuously), and then it may be identified whether or not a mark or space adjacent to the portion is longer than the prescribed length.

As described above, according to Embodiment 1, it is made possible to calculate, using the PR12221ML signal processing, a differential metric of a pattern by which the square of the Euclidean distance between two ideal signals, i.e., the state transition path having the maximum likelihood and the state transition path having the second maximum likelihood, is 12 or 14. Thus, it is made possible to represent how each edge is shifted in a detection signal including a plurality of edges, with an index correlating with the error rate. As a result, the recording and reproduction quality of a high density information recording medium can be evaluated.

Using such an evaluation index, it is made possible to feedback the results of the recording quality evaluation to a reproduction compensation section or a recording compensation section at the time of information recording to or reproduction from a high density information recording medium. Thus, the reproduction errors can be reduced, and high quality recording with few errors can be performed.

The preamplifier section 3, the AGC section 4 and the waveform equalization section 5 shown in FIG. 1 in this embodiment may be structured as one analog integrated circuit (LSI).

The preamplifier section 3, the AGC section 4, the waveform equalization section 5, the A/D conversion section 6, the PLL section 7, the PR equalization section 8, the maximum likelihood decoding section 9, the signal evaluation index detection section 10 and the optical disc controller section 15 may be structured as one integrated circuit (LSI) having both analog and digital elements mounted thereon.

The above-described optical disc apparatus 100 is a reproduction apparatus for reproducing information from an information recording medium, but may be a recording and reproduction apparatus or a recording apparatus.

In such a case, a circuit for recording is added, but the description thereof will be omitted in this example. For example, the optical disc apparatus 100 includes a recording section for recording information on the information recording medium 1. The recording section forms marks on the track by irradiation with laser light to record a data sequence in which marks and spaces between the marks are arranged alternately. The recording section includes, for example, a pattern generation section, a recording compensation section and a laser driving section. The pattern generation section outputs a recording pattern for adjusting the edge of the recording mark. The recording compensation section receives a recording parameter from the optical disc controller section and generates a laser emission waveform pattern in accordance with the recording parameter and the recording pattern. The laser driving section controls the laser emission operation of the optical head section 2 in accordance with the generated laser emission waveform pattern. The optical head section 2 irradiates the track with laser light to record marks on the track and thus to record a data sequence in which marks and spaces are arranged alternately.

These examples of the structure of the optical disc apparatus do not limit the present invention, and other structures are usable.

In the above embodiment, maximum likelihood decoding is performed using a state transition rule defined by a code having a shortest mark length of 2 and the equalization method PR(1,2,2,2,1), but the present invention is not limited to this.

For example, the present invention is also applicable to a case where a code having a shortest mark length of 2 or 3 and the equalization method PR(C0, C1, C1, C0) are used, or to a case where a code having a shortest mark length of 3 and the equalization method PR(C0, C1, C2, C1, C0) are used. C0, C1 and C2 may each be any positive numeral.

In the above embodiment, only the marks and spaces having the shortest length are classified in detail, but the present invention is not limited to this.

For example, the present invention is applicable to marks or spaces having the second shortest length, or marks or spaces which are shorter than a prescribed length, instead of marks having the shortest length.

Now, the information recording medium according to the present invention will be described in more detail.

(Main Parameters)

Examples of the recording mediums to which the present invention is applicable include Blu-ray disc (BD) and optical discs of other formats. Herein, BDs will be described. There are the following types of BD in accordance with the characteristics of the recording layers: reproduction-only BD-ROM, write once BD-R, rewritable BD-RE and the like. The present invention is applicable to any of the ROM (reproduction only) type, the R (write once) type and the RE (rewritable) type of BDs and other format recording mediums. The main optical constants and physical formats of the Blu-ray disc are disclosed in "Illustrated Blu-ray Disc Reader" published by Ohmsha, Ltd. or the white papers put on the web site of the Blu-ray Association (http://www.blu-raydisc.com/).

For the BD, laser light having a wavelength of about 405 nm (where the tolerable error range is ±5 nm with respect to the standard value of 405 nm, 400 to 410 nm) and an objective lens having a numerical aperture (NA) of about 0.85 (where the tolerable error range is ±0.01 nm with respect to the standard value of 0.85, 0.84 to 0.86) are used. The track pitch of the BD is about 0.32 μm (where the tolerable error range is 0.010 μm with respect to the standard value of 0.320 μm, 0.310 to 0.330 μm), and one or two recording layers are provided. One or two recording layers each having a recording surface are provided on the side on which the laser light is incident. The distance from the surface of a protective layer of the BD to the recording surface is 75 μm to 100 μm.

As the modulation system for a recording signal, 17PP modulation is used. The length of the shortest mark to be recorded (2T mark; T is a cycle of the reference clock (the reference cycle of modulation in the case where a mark is recorded by a prescribed modulation rule)) is 0.149 μm (or 0.138 μm) (channel bit length T is 74.50 nm (or 69.00 nm)). The recording capacity is 25 GB (or 27 GB) (more precisely, 25.025 GB (or 27.020 GB) where one layer is provided on one side, or 50 GB (or 54 GB) (more precisely, 50.050 GB (or 54.040 GB) where two layers are provided on one side.

The channel clock frequency is 66 MHz (channel bit rate: 66.000 Mbits/s) at the standard transfer rate (BD1×), 264 MHz (channel bit rate: 264.000 Mbits/s) at the 4× transfer rate (BD4×), 396 MHz (channel bit rate: 396.000 Mbits/s) at the 6× transfer rate (BD6×) rate, and 528 MHz (channel bit rate: 528.000 Mbits/s) at the 8× transfer rate (BD8×).

The standard linear velocity (reference linear velocity, 1×) is 4.917 m/sec. (or 4.554 m/sec.). The linear velocity at 2×, 4×, 6× and 8× is respectively 9.834 m/sec., 19.668 m/sec., 29.502 m/sec., and 39.336 m/sec. A linear velocity higher than the reference linear velocity is generally a positive integral multiple of the reference linear velocity, but is not limited to an integral multiple and may be a positive real number multiple of the reference linear velocity. A linear velocity lower than the reference linear velocity, such as 0.5 times (0.5×), may also be defined.

The above description is regarding BDs already developed into commercial products, which include one layer or two layers and have a recording capacity per layer of, mainly, about 25 GB (or about 27 GB). For realizing a higher capacity, a high density BD having a recording capacity per layer of about 32 GB or about 33.4 GB and a BD including three or four layers are also under research, and these BDs will also be described below.

(Multiple Layers)

Figure 15:
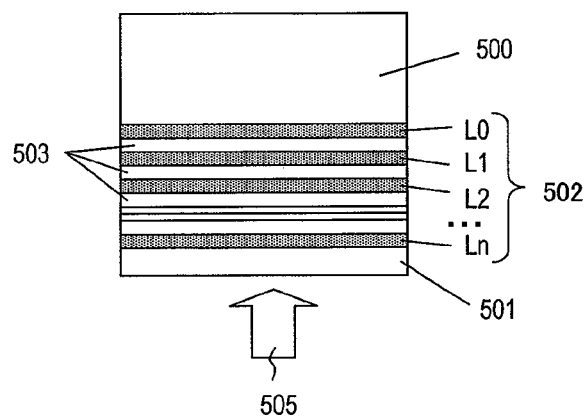
FIG. 15 shows an example of a structure of a multi-layer disc according to an embodiment of the present invention.

In the case of a one-sided disc used for information reproduction and/or recording with laser light incident on the side of the protective layer, where there are two or more recording layers, there are a plurality of recording layers between the substrate and the protective layer. An example of a general structure of such a multi-layer disc is shown in FIG. 15. The disc shown here includes (n+1) information recording layers 502 (n is an integer of 0 or greater). A specific structure of the optical disc is as follows. A cover layer 501, the (n+1) information recording layers (Ln through L0 layers) 502, and a substrate 500 are sequentially stacked from a surface on which laser light 505 is incident. Between each two adjacent layers of the (n+1) information recording layers 502, an intermediate layer 503 acting as an optical buffer member is inserted. The reference layer (L0) is provided at a deepest position which is away from the light incidence surface by a prescribed distance (a position farthest from the light source), and the other layers (L1, L2, ... Ln) are stacked on the reference layer (L0) toward the light incidence surface.

The distance from the light incidence surface to the reference layer L0 of the multi-layer disc may be substantially the same as the distance from the light incidence surface to the recording layer of a single layer disc (e.g., about 0.1 mm). By keeping the distance to the deepest (farthest) layer the same regardless of the number of layers in this manner (i.e., by making the distance the same as the distance in the single layer disc), the following effects are provided. The compatibility can be maintained between a single layer disc and a multi-layer disc regarding the access to the reference layer. In addition, the influence of the tilt is prevented from being increased even when the number of layers increases, for the following reason. The deepest layer is most influenced by the tilt. However, in the case where the distance to the deepest layer is made the same as the distance in the single layer disc, the distance to the deepest layer is not increased even if the number of layers increases.

Regarding the spot advancing direction (also referred to as the "track direction or spiral direction"), either the parallel path or the opposite path is usable.

By the parallel path, the reproduction direction is the same in all the layers. Namely, the spot advancing direction is from the innermost end toward the outermost end in all the layers, or from the outermost end toward the innermost end in all the layers.

By the opposite path, the reproduction direction in one layer is opposite to the reproduction direction in a layer adjacent thereto. Specifically, where the spot advancing direction is from the innermost end toward the outermost end in the reference layer (L0), the reproduction direction is from the outermost end toward the innermost end in the recording layer L1 and is from the innermost end toward the outermost end in the recording layer L2. Namely, the reproduction direction is from the innermost end toward the outermost end in the recording layer Lm (m is 0 or an even number) and is from the outermost end toward the innermost end in the recording layer Lm+1. Alternatively, the reproduction direction is from the outermost end toward the innermost end in the recording layer Lm (m is 0 or an even number) and is from the innermost end toward the outermost end in the recording layer Lm+1.

The thickness of the protective layer (cover layer) is set to be smaller because the numerical aperture (NA) is higher and so the focal distance is shorter, and also in order to suppress the influence of the distortion of the spot caused by the tilt. The numerical aperture NA is set to about 0.85 for the BD whereas the numerical aperture NA is set to 0.45 for the CD and 0.65 for the DVD. For example, among the total thickness of the recording medium of about 1.2 mm, the thickness of the protective layer may be 10 to 200 µm. More specifically, on a substrate having a thickness of about 1.1 mm, a transparent protective layer having a thickness of about 0.1 mm may be provided in the case of a single layer disc, and a protective layer having a thickness of about 0.075 mm and an intermediate layer (spacer layer) having a thickness of about 0.025 mm may be provided in the case of a two-layer disc. For a disc including three or more layers, the thickness of the protective layer and/or space layer may be thinner.

(Structural Examples of Discs Having One Through Four Layers)

Figure 16:
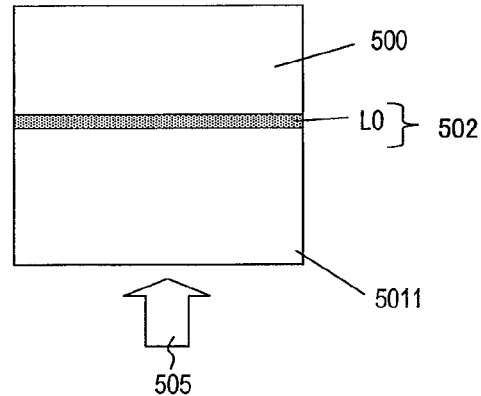
FIG. 16 shows an example of a structure of a single layer disc according to an embodiment of the present invention.
Figure 17:
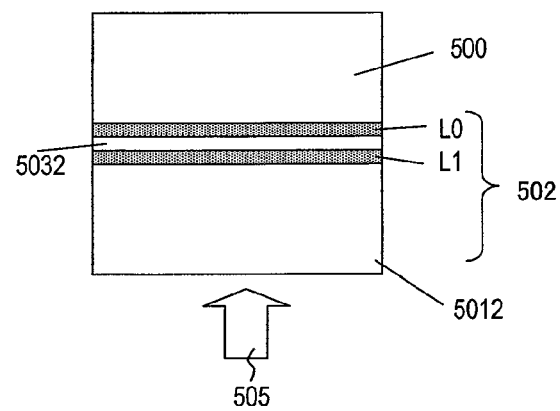
FIG. 17 shows an example of a structure of a two-layer disc according to an embodiment of the present invention.
Figure 18:
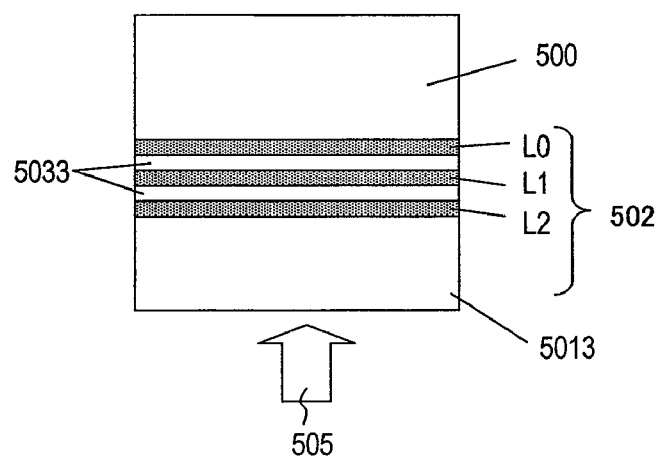
FIG. 18 shows an example of a structure of a three-layer disc according to an embodiment of the present invention.
Figure 19:
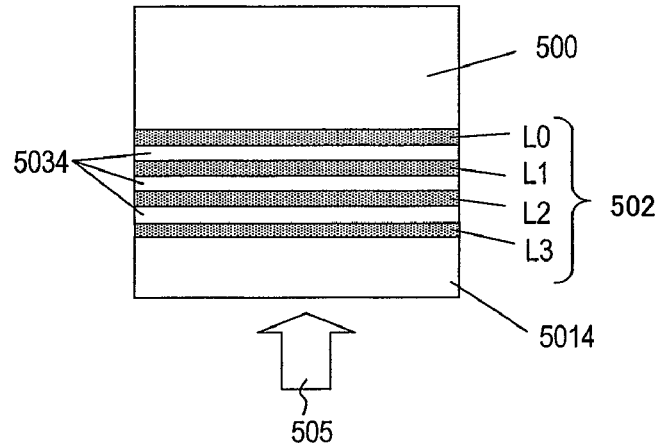
FIG. 19 shows an example of a structure of a four-layer disc according to an embodiment of the present invention.

Now, FIG. 16 shows an example of a structure of a single layer disc, FIG. 17 shows an example of a structure of a two-layer disc, FIG. 18 shows an example of a structure of a three-layer disc, and FIG. 19 shows an example of a structure of a four-layer disc. As described above, where the distance from the light incidence surface to the reference layer L0 is made the same, the total thickness of the disc is about 1.2 mm (it is preferable that the total thickness is equal to or less than 1.40 mm including label printing or the like), the thickness of the substrate 500 is about 1.1 mm, and the distance from the light incidence surface to the reference layer L0 is about 0.1 mm in any of the discs shown in FIG. 17 through FIG. 19. In the single layer disc shown in FIG. 16 (n=0 in FIG. 15), the thickness of a cover layer 5011 is about 0.1 mm. In the two-layer disc shown in FIG. 17 (n=1 in FIG. 15), the thickness of a cover layer 5012 is about 0.075 mm and the thickness of a space layer 5032 is about 0.025 mm. In the three-layer disc shown in FIG. 18 (n=2 in FIG. 15) and the four-layer disc shown in FIG. 19 (n=3 in FIG. 15), the thickness of cover layers 5013 and 5014 and/or the thickness of space layers 5033 and 5034 are still thinner.

(Production Method of the Optical Disc)

These single layer or multi-layer discs (disc having k number of recording layers; k is an integer of 1 or greater) can be each produced by the following process.

A substrate having a thickness of about 1.1 mm is irradiated with laser light having a wavelength of 400 nm or greater and 410 nm or less via an objective lens having a numerical aperture of 0.84 or greater and 0.86 or less. Thus, k number of recording layers from which information is reproduceable is formed.

Next, (k−1) number of space layers are formed between a recording layer and another recording layer. In the case of a single layer disc, k=1. Since k−1=0, no space layer is formed.

Next, on the k'th recording layer counted from the substrate side (in the case of a multi-layer disc, the recording layer farthest from the substrate), a protective layer having a thickness of 0.1 mm or less is formed.

During the step of forming the recording layers, when an i'th recording layer counted from the substrate side (i is an odd number of 1 or greater and k or less) is formed, a concentric or spiral track is formed such that the reproduction direction is from the innermost end toward the outermost end of the disc. When a j'th recording layer counted from the substrate side (j is an even number of 1 or greater and k or less) is formed, a concentric or spiral track is formed such that the reproduction direction is from the outermost end toward the innermost end of the disc. In the case of a single layer disc, k=1. In the case where k=1, i, which is an odd number that is 1 or greater and k or less, is only "1". Therefore, only one recording layer is formed as the i'th recording layer. In the case where k=1, j, which is an even number that is 1 or greater and k or less, does not exist. Therefore, no layer is formed as the j'th recording layer.

In the track of the recording layers, various types of areas can be assigned.

(Reproduction Apparatus of the Optical Disc)

Reproduction from such a single layer or multi-layer disc (disc having k number of recording layers; k is an integer of 1 or greater) is performed by a reproduction apparatus having the following structure.

The disc has a structure of including a substrate having a thickness of about 1.1 mm, k number of recording layers provided on the substrate, (k−1) number of space layers provided between a recording layer and another recording layer (in the case of a single layer disc, k=1, and since k−1=0, no space layer is formed), and a protective layer having a thickness of 0.1 mm or less and provided on the k'th recording layer counted from the substrate side (in the case of a multi-layer disc, the recording layer farthest from the substrate). A track is formed on each of the k number of recording layers, and in at least one of the tracks, various types of areas can be assigned.

An optical head irradiates the k number of recording layers with laser light having a wavelength of 400 nm or greater and 410 nm or less via an objective lens having a numerical aperture of 0.84 or greater and 0.86 or less from the side of a surface of the protective layer. Thus, information is made reproduceable from each of the k number of recording layers.

On the i'th recording layer counted from the substrate side (i is an odd number of 1 or greater and k or less), a concentric or spiral track is formed. A control section for reproducing information from the innermost end toward the outermost end of the disc controls the reproduction direction, so that information can be reproduced from the i'th recording layer.

On the j'th recording layer counted from the substrate side (j is an odd number of 1 or greater and k or less), a concentric or spiral track is formed. The control section for reproducing information from the outermost end toward the innermost end of the disc controls the reproduction direction, so that information can be reproduced from the j'th recording layer.

(Modulation)

Now, the modulation system of the recording signal will be described. For recording data (original source data/pre-modulation binary data) on a recording medium, the data is divided into parts of a prescribed size, and the data divided into parts of the prescribed size is further divided into frames of a prescribed length. For each frame, a prescribed sync. code/synchronization code stream is inserted (frame sync. area). The data divided into the frames is recorded as a data code stream modulated in accordance with a prescribed modulation rule matching the recording/reproduction signal characteristic of the recording medium (frame data area).

The modulation rule may be, for example, an RLL (Run Length Limited) coding system by which the mark length is limited. The notation "RLL(d, k)" means that the number of 0's appearing between 1 and 1 is d at the minimum and k at the maximum (d and k are natural numbers fulfilling d<k). For example, when d=1 and k=7, where T is the reference cycle of modulation, the length of the mark or space is 2T at the shortest and 8T at the longest. Alternatively, the modulation rule may be 1-7PP modulation, in which the following features [1] and [2] are added to the RLL(1,7) modulation. "PP" of 1-7PP is an abbreviation of Parity preserve/Prohibit Repeated Minimum Transition Length. [1] "Parity preserve" represented by the first "P" means that whether the number of 1's of the pre-modulation source data bits is an odd number or an even number (i.e., Parity) matches whether the number of 1's of the corresponding post-modulation bit pattern is an odd number or an even number. [2] "Prohibit Repeated Minimum Transition Length" represented by the second "P" means a mechanism for limiting the number of times the shortest marks and spaces are repeated on the post-modulation recording wave (specifically, a mechanism for limiting the number of times 2T is repeated to 6).

When the recording density increases, a plurality of recording densities may be possibly provided for optical disc mediums. In such a case, only a part of the various formats and methods described above may be adopted, or a part thereof may be replaced with another format or method.

Now, a physical structure of an optical disc will be described.

Figure 20:
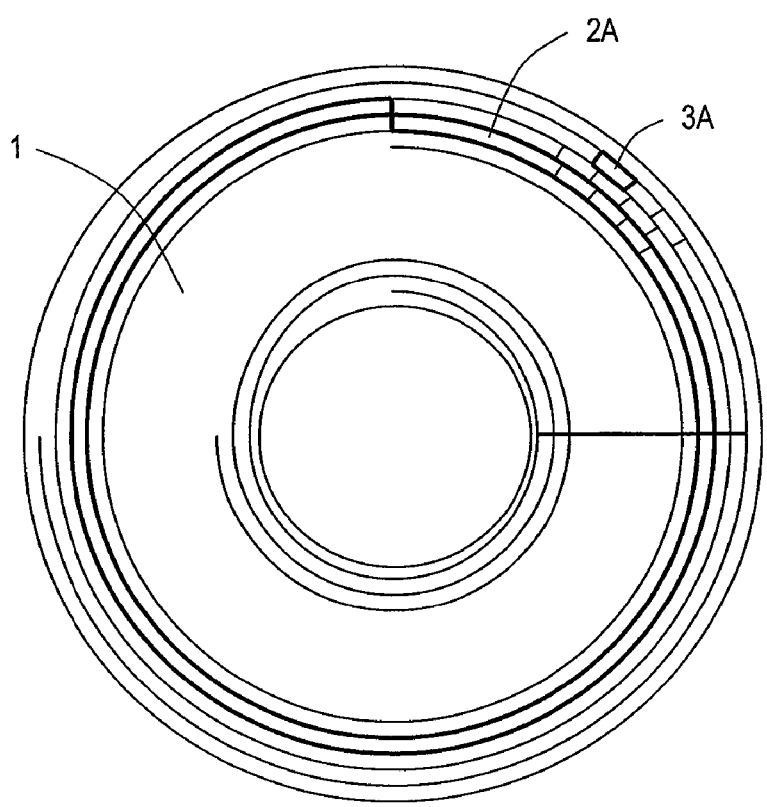
FIG. 20 shows a physical structure of an optical disc according to an embodiment of the present invention.

FIG. 20 shows a physical structure of an optical disc 1 according to this embodiment. On the discus-shaped optical disc 1, a great number of tracks 2A are formed concentrically or in a spiral, for example. In each track 2A, a great number of tiny sectors are formed. As described later, data is recorded on each track 2A in units of blocks 3A each having a predetermined size.

The optical disc 1 according to this embodiment has an expanded recording capacity per information recording layer as compared with a conventional optical disc (for example, a BD of 25 GB). The recording capacity is expanded by raising the recording linear density, for example, by decreasing the length of a recording mark to be recorded on the optical disc. Here, the expression "raising the recording linear density" means to decrease the channel bit length. The "channel bit length" refers to a length corresponding to cycle T of the reference clock (the reference cycle T of modulation in the case where a mark is recorded by a prescribed modulation rule). The optical disc 1 may include a plurality of layers. In the following, only one information recording layer will be described for the convenience of explanation. Even where the width of the track is the same among a plurality of layers provided in the optical disc, the recording linear density may be varied on a layer-by-layer basis by making the mark length different among different layers while making the mark length the same in the same layer.

The track 2A is divided into blocks by a data recording unit of 64 kB (kilobytes), and the blocks are sequentially assigned block address values. Each block is divided into sub blocks each having a prescribed length. Three sub blocks form one block. The sub blocks are assigned sub block numbers of 0 through 2 from the first sub block.

(Recording Density)

Now, the recording density will be described with reference to FIG. 21, FIG. 22 and FIG. 23.

FIG. 21(a) shows an example of a 25 GB BD. For the BD, the wavelength of laser light 123 is 405 nm and the numerical aperture (NA) of an objective lens 220 is 0.85.

Like in the case of a DVD, also in the case of a BD, the recording data is recorded as marks 120 and 121 formed by a physical change on the track 2A of the optical disc. A mark having the shortest length among these marks is referred to as the "shortest mark". In the figure, the mark 121 is the shortest mark.

When the recording capacity is 25 GB, the physical length of the shortest mark 121 is 0.149 μm. This corresponds to about 1/2.7 of that of a DVD. Even if the resolving power of the laser light is raised by changing the wavelength parameter (405 nm) and the NA parameter (0.85) of the optical system, the physical length of the shortest mark is close to the limit of the optical resolving power, i.e., the limit at which a light beam can identify a recording mark.

Figure 22:
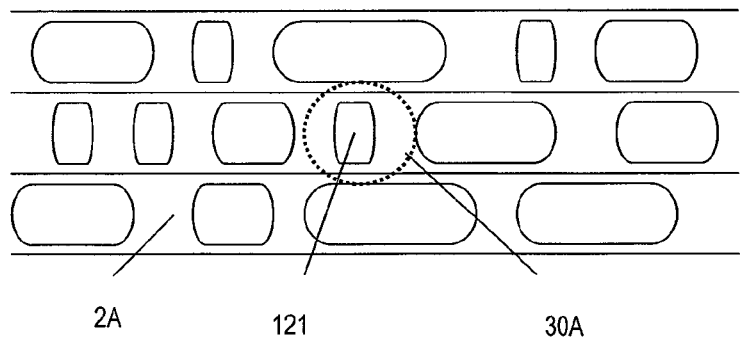
FIG. 22 shows how a mark sequence recorded on a track is irradiated with a light beam according to an embodiment of the present invention.

FIG. 22 shows how a mark sequence recorded on the track is irradiated with a light beam. In the case of a BD, an optical spot 30A has a diameter of about 0.39 μm because of the above-mentioned parameters of the optical system. When the recording linear density is raised without changing the structure of the optical system, the recording mark becomes smaller with respect to the diameter of the optical spot 30A, and therefore the resolving power for reproduction is declined.

For example, FIG. 21(b) shows an example of an optical disc having a recording density higher than that of the 25 GB BD. For this disc also, the wavelength of the laser light 123 is 405 nm and the numerical aperture (NA) of the objective lens 220 is 0.85. A mark shortest among the marks 125 and 124 of the disc, namely, the mark 125, has a physical length of 0.1115 μm. In the disc in FIG. 21(b), as compared with the disc shown in FIG. 21(a), the diameter of the spot is the same at about 0.39 μm but the recording mark is smaller and the inter-mark gap is narrower. Therefore, the resolving power for reproduction is declined.

An amplitude of a reproduction signal obtained by reproducing a recording mark using a light beam decreases as the recording mark is shortened, and becomes almost zero at the limit of the optical resolving power. The inverse of the cycle of the recording mark is called "spatial frequency", and the relationship between the spatial frequency and the signal amplitude is called OTF (Optical Transfer Function). The signal amplitude decreases almost linearly as the spatial frequency increases. The critical frequency for reproduction at which the signal amplitude becomes zero is called "OTF cutoff".

Figure 23:
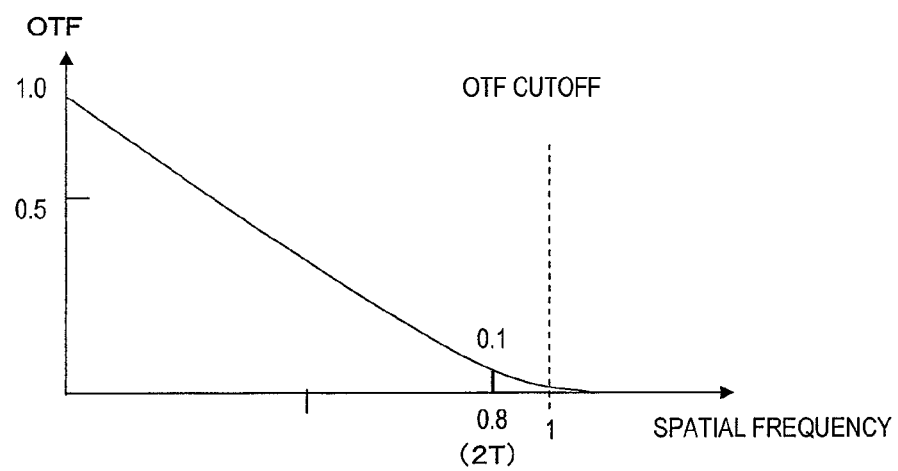
FIG. 23 shows the relationship between the OTF and the shortest recording mark when the recording capacity is 25 GB according to an embodiment of the present invention.

FIG. 23 is a graph showing the relationship between the OTF and the shortest recording mark when the recording capacity is 25 GB. The spatial frequency of the shortest recording mark of the BD is about 80% with respect to the OTF cutoff, which is close to the OTF cutoff. It is also seen that the amplitude of the reproduction signal of the shortest mark is very small at about 10% of the maximum detectable amplitude. For the BD, the recording capacity at which the spatial frequency of the shortest recording mark is very close to the OTF cutoff, i.e., the recording capacity at which the reproduction amplitude of the shortest mark is almost zero, is about 31 GB. When the frequency of the reproduction signal of the shortest mark is around, or exceeds, the OFF cutoff frequency, the resolving power of the laser light is close to the limit or may exceed the limit. In such an area, the amplitude of the reproduction signal decreases and the S/N ratio is drastically deteriorated.

Therefore, with the recording linear density which is assumed for the high density optical disc shown in FIG. 21(b), the frequency of the shortest mark of the reproduction signal is in the vicinity of the OTF cutoff (including a case where the frequency is equal to or lower than the OTF cutoff, but is not significantly lower than the OTF cutoff) or equal to or higher than the OTF cutoff.

Figure 24:
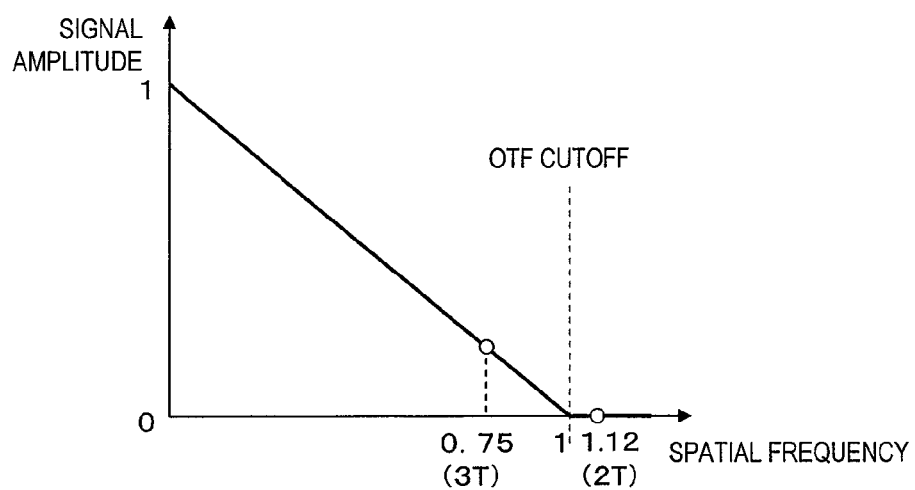
FIG. 24 shows an example in which the spatial frequency of the shortest mark (2T) is higher than the OTF cutoff frequency and the amplitude of a 2T reproduction signal is 0 according to an embodiment of the present invention.
Figure 26:
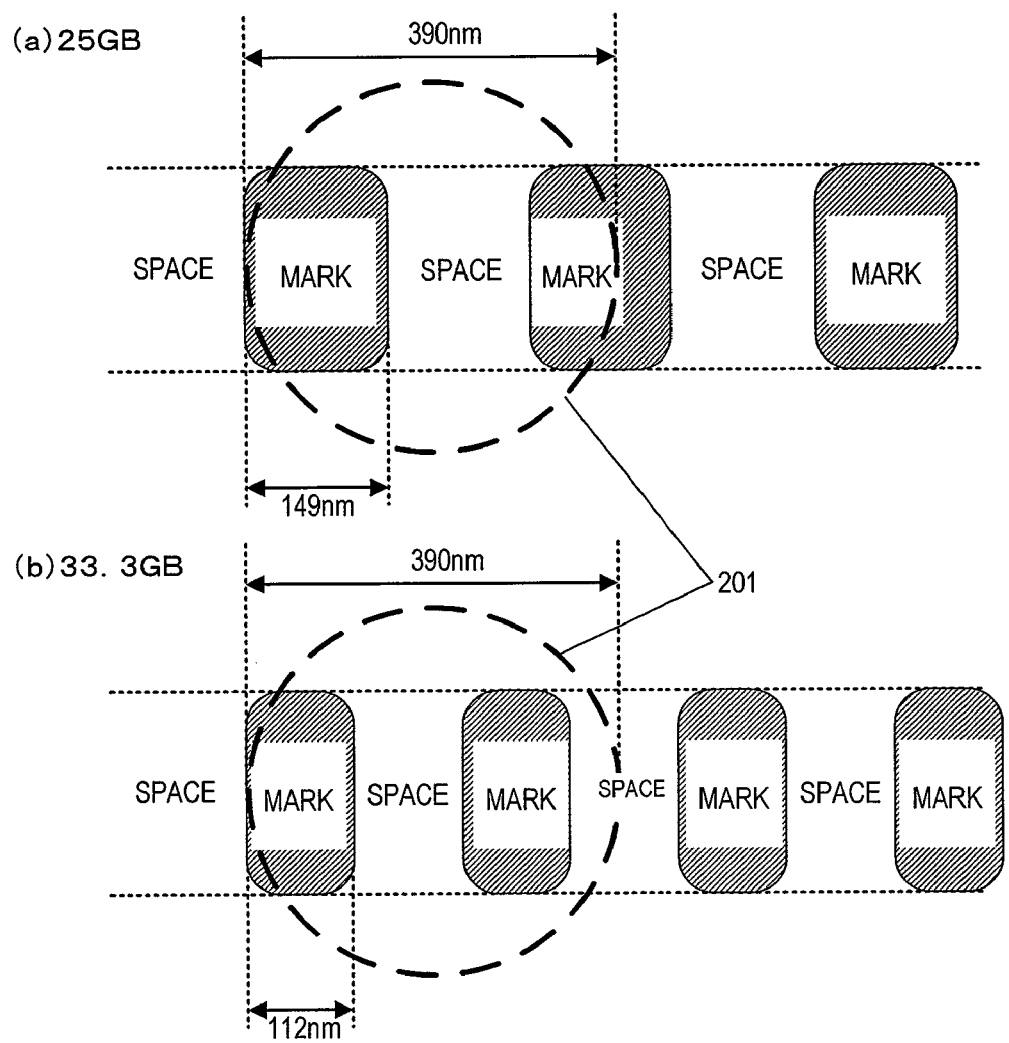
FIG. 26 shows examples of relationship between an optical spot size and the mark length.
Figure 27:
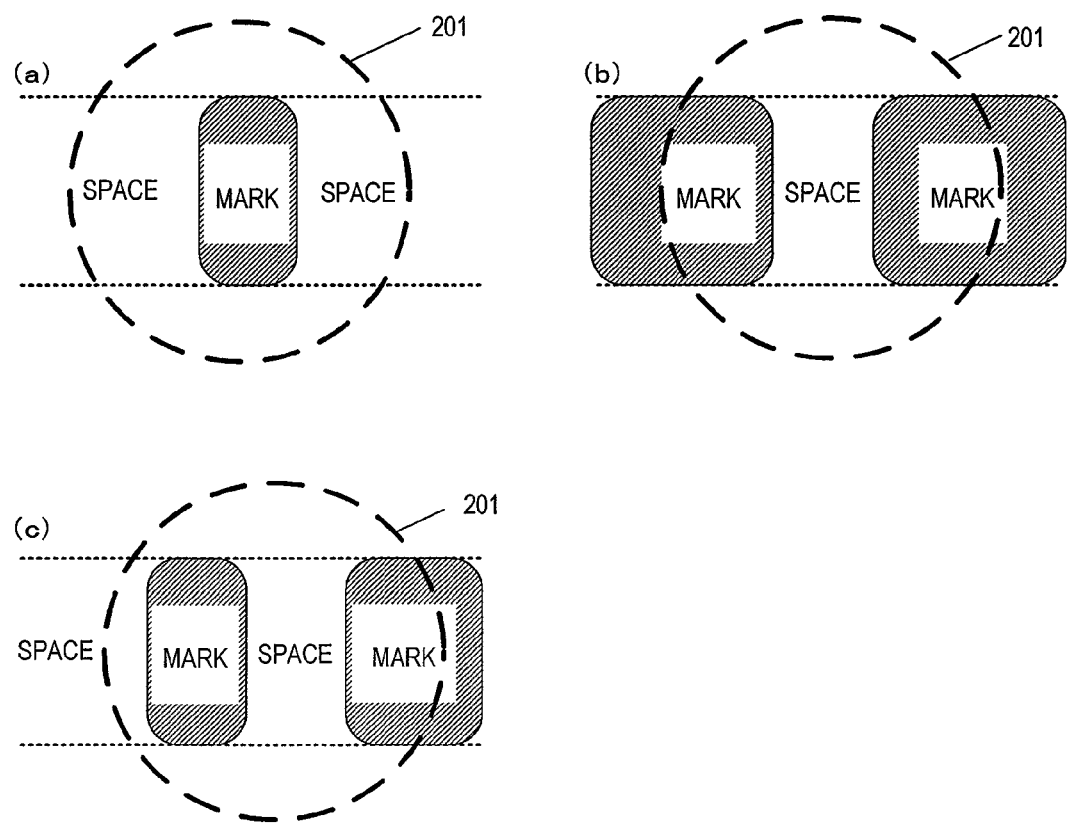
FIG. 27 shows examples of relationship between an optical spot size and a pattern including a plurality of edges.

FIG. 24 is a graph showing an example the relationship between the signal amplitude and the spatial frequency when the spatial frequency of the shortest mark (2T) is higher than the OTF cutoff frequency and the amplitude of a 2T reproduction signal is 0. In FIG. 24, the spatial frequency of the shortest mark (2T) is 1.12 times of the OTF cutoff frequency.

(Relationship Among the Wavelength, Numerical Aperture and Mark Length)

The relationship among the wavelength, numerical aperture and length of a mark/space of a higher recording density disc B is as follows.

Where the shortest mark length is TM nm and the shortest space length is TS nm, (shortest mark length+shortest space length) P is represented as (TM+TS) nm. In the case of 17 modulation, P=2T+2T=4T. Where the three parameters, i.e., the laser light wavelength $\lambda$ (405 nm±5 nm, i.e., 400 to 410 nm), the numerical aperture (NA) (0.85±0.01, i.e., 0.84 to 0.86), and the length P of the shortest mark+the shortest space (in the case of 17 modulation, P=2T+2T=4T because the shortest length is 2T) are used, when the reference T decreases to fulfill $P \leq \lambda/2NA$, the spatial frequency of the shortest mark exceeds the OTF cutoff frequency.

The reference T corresponding to the OTF cutoff frequency when NA=0.85 and $\lambda$=405 nm is:

T=405/(2×0.85)/4=59.558 nm. (When $P > \lambda/2NA$, the spatial frequency of the shortest mark is lower than the OTF cutoff frequency.)

In this manner, merely by increasing the recording linear density, the S/N ratio is deteriorated by the limit of the optical resolution. The deterioration of the S/N ratio caused by increasing the number of information recording layers may be occasionally intolerable from the viewpoint of the system margin. As described above, the deterioration of the S/N ratio is conspicuous especially where the frequency of the shortest mark is higher than the OTF cutoff frequency.

In the above, the frequency of the reproduction signal of the shortest mark and the OTF cutoff frequency are compared in relation with the recording density. When the density improvement is more advanced, a recording density (recording linear density, recording capacity) corresponding to each case can be set by the principle described above based on the relationship between the frequency of the reproduction signal of the second shortest mark (also the third shortest mark (also the second shortest or longer mark) and the OTF cutoff frequency.

(Recording Density and the Number of Layers)

For a BD usable with laser light having a wavelength of 405 nm and an objective lens having a numerical aperture of 0.85, the following can be considered as a specific recording capacity per layer in the case where the spatial frequency of the shortest mark is in the vicinity of the OTF cutoff: about 29 GB (e.g., 29.0 GB±0.5 GB or 29 GB±1 GB, etc.) or larger, about 30 GB (e.g., 30.0 GB±0.5 GB or 30 GB±1 GB, etc.) or larger, about 31 GB (e.g., 31.0 GB±0.5 GB or 31 GB±1 GB, etc.) or larger, about 32 GB (e.g., 32.0 GB±0.5 GB or 32 GB±1 GB, etc.) or larger, and the like.

In the case where the spatial frequency of the shortest mark is equal to or higher than the OTF cutoff, the following can be considered as a recording capacity per layer: about 32 GB (e.g., 32.0 GB±0.5 GB or 32 GB±1 GB, etc.) or larger, about 33 GB (e.g., 33.0 GB±0.5 GB or 33 GB±1 GB, etc.) or larger, about 33.3 GB (e.g., 33.3 GB±0.5 GB or 33 GB±1 GB, etc.) or larger, about 33.4 GB (e.g., 33.4 GB±0.5 GB or 33.4 GB±1 GB, etc.) or larger, about 34 GB (e.g., 34.0 GB±0.5 GB or 34 GB±1 GB, etc.) or larger, about 35 GB (e.g., 35.0 GB±0.5 GB or 35 GB±1 GB, etc.) or larger, and the like.

Especially where the recording density is about 33.3 GB, a recording capacity of about 100 GB (99.9 GB) is realized with three layers. Where the recording density is about 33.4 GB, a recording capacity of 100 GB or greater (100.2 GB) is realized with three layers. This generally matches the recording capacity of a BD including four layers each having a recording density of 25 GB. For example, where the recording density is 33 GB, 33×3=99 GB, which is different from 100 GB by 1 GB (equal to or less than 1 GB). Where the recording density is 34 GB, 34×3=102 GB, which is different from 100 GB by 2 GB (equal to or less than 2 GB). Where the recording density is 33.3 GB, 33.3×3=99.9 GB, which is different from 100 GB by 0.1 GB (equal to or less than 0.1 GB). Where the recording density is 33.4 GB, 33.4×3=100.2 GB, which is different from 100 GB by 0.2 GB (equal to or less than 0.2 GB).

As described above, when the recording density is significantly expanded, precise reproduction becomes difficult because of the influence of the reproduction characteristic of the shortest mark. As a recording density which is suppressed from being expanded significantly but realizes a recording capacity of 100 GB or greater, about 33.4 GB is realistically usable.

In this situation, there are the following alternatives for the disc structure: including four layers each having 25 GB, or including three layers each having 33 to 34 GB. When the number of layers increases, the reproduction signal amplitude of each recording layer is decreased (the S/N ratio is deteriorated) or the influence of multi-layer stray light (signal from an adjacent recording layer) is exerted, for example. A disc including three layers each having 33 to 34 GB, as opposed to a disc including four layers each having 25 GB, can realize a recording capacity of about 100 GB while suppressing the influence of the stray light as much as possible, i.e., with a smaller number of layers (with three layers as opposed to four layers). Thus, a disc manufacture wishing to realize about 100 GB while avoiding the increase of the number of the layers as much as possible can choose a disc including three layers each having 33 to 34 GB. By contrast, a disc manufacturer wishing to realize about 100 GB while keeping the conventional format (the recording density of 25 GB) can choose a disc including four layers each having 25 GB. In this manner, manufacturers with different purposes can realize the respective purposes with different structures. This provides a certain degree of freedom in disc designing.

Where the recording density per layer is about 30 to 32 GB, a recording capacity of 120 GB or greater is realized with a four-layer disc although 100 GB is not reached by a three-layer disc (about 90 to 96 GB). Where the recording density is about 32 GB, a four-layer disc realizes a recording capacity of about 128 GB. The numerical value of 128 matches a power of 2 (seventh power of 2) which is convenient to be processed by a computer. As compared to the disc realizing about 100 GB with three layers, the disc realizing about 128 GB with four layers has less influence on the reproduction characteristic of the shortest mark.

Based on this, for expanding the recording density, a plurality of recording densities may be provided (for example, about 32 GB and about 33.4 GB) and combined with a plurality of numbers of layers. In this manner, the disc manufacturers can be provided with a certain degree of freedom in designing. For example, a manufacturer wishing to increase the capacity while suppressing the influence of a larger number of layers can choose to produce a three-layer disc of about 100 GB in which each of three layers has 33 to 34 GB. A manufacture wishing to increase the capacity while suppressing the influence on the reproduction characteristic can choose to produce a four-layer disc of about 120 GB in which each of four layers has 30 to 32 GB.

As described above, a reproduction signal evaluation method according to the present invention includes a step of generating a binary signal from an information recording medium on which a data sequence including marks and spaces in combination is recordable, using a PRML signal processing method from a signal obtained by reproducing the data sequence; and a differential calculation step of calculating a differential metric using a first state transition path having a maximum likelihood and a second state transition path having a second maximum likelihood, and a reproduction signal, the first state transition path and the second state transition path being obtained based on the binary signal. In a pattern including a shortest mark and a shortest space adjacent before or after the shortest mark, a shift amount of an edge of the shortest mark is obtained from a differential metric calculated regarding one of a first pattern in which a space adjacent to the shortest mark and not adjacent to the shortest space is longer than the shortest space; and a second pattern in which a mark adjacent to the shortest space and not adjacent to the shortest mark is longer than the shortest mark.

In an embodiment, where a reference cycle of the data sequence is T, the shortest mark and the shortest space each have a length of 2T; and where binary data of a pattern including the shortest mark and the shortest space adjacent to each other is represented by "0" and "1", the shift amount of the edge of the shortest mark is obtained from a differential metric calculated regarding a pattern, the binary data of which is "x000110011x" or "x001100111x" ("x" is "0" or "1").

In an embodiment, where a reference cycle of the data sequence is T, the shortest mark and the shortest space each have a length of 2T; and where binary data of a pattern including the shortest mark and the shortest space adjacent to each other is represented by "0" and "1", the shift amount of the edge of the shortest mark is obtained from a differential metric calculated regarding a pattern, the binary data of which is "x110011000x" or "x111001100x" ("x" is "0" or "1").

An information recording medium according to the present invention is an information recording medium on which a data sequence including marks and spaces in combination is recordable. The information recording medium has a track on which the data sequence is recordable. A reproduction signal from the information recording medium is evaluated using a prescribed method. The prescribed method includes a step of generating a binary signal using a PRML signal processing method from a signal obtained by reproducing the data sequence from the information recording medium; and a differential calculation step of calculating a differential metric using a first state transition path having a maximum likelihood and a second state transition path having a second maximum likelihood, and a reproduction signal, the first state transition path and the second state transition path being obtained based on the binary signal. In a pattern including a shortest mark and a shortest space adjacent before or after the shortest mark, a shift amount of an edge of the shortest mark is obtained from a differential metric calculated regarding one of a first pattern in which a space adjacent to the shortest mark and not adjacent to the shortest space is longer than the shortest space; and a second pattern in which a mark adjacent to the shortest space and not adjacent to the shortest mark is longer than the shortest mark.

A reproduction apparatus according to the present invention is a reproduction apparatus for reproducing information from the above-described information recording medium. The reproduction apparatus includes an irradiation section for irradiating the track with laser light; a light receiving section for receiving reflected light of the laser light used for the irradiation; and a reproduction section for reproducing the data sequence based on a signal obtained by the received light.

A recording apparatus according to the present invention is a recording apparatus for recording information on the above-described information recording medium. The recording apparatus includes an irradiation section for irradiating the track with laser light; and a recording section for forming marks on the track by the irradiation to record a data sequence including marks and spaces between the marks arranged alternately.

A reproduction signal evaluation method according to the present invention is a method for evaluating a reproduction signal obtained from an information recording medium on which a data sequence including marks and spaces in combination is recordable. The method includes a recognition step of recognizing a prescribed pattern from the data sequence; and an evaluation step of evaluating a reproduction signal corresponding to the recognized pattern. The recognition step includes the steps of recognizing a pattern, included in the data sequence, including a first mark, a first space adjacent before or after the first mark, and a second mark not adjacent to the first mark and adjacent to the first space; and recognizing, when the first space and the second mark each have a length equal to or shorter than a prescribed length, whether or not a second space not adjacent to the first mark and adjacent to the second mark is longer than the prescribed length.

An information recording medium according to the present invention is an information recording medium on which a data sequence including marks and spaces in combination is recordable. The information recording medium has a track on which the data sequence is recordable. A reproduction signal from the information recording medium is evaluated using a prescribed method. The prescribed method includes a recognition step of recognizing a prescribed pattern from the data sequence; and an evaluation step of evaluating a reproduction signal corresponding to the recognized pattern. The recognition step includes the steps of recognizing a pattern, included in the data sequence, including a first mark, a first space adjacent before or after the first mark, and a second mark not adjacent to the first mark and adjacent to the first space; and recognizing, when the first space and the second mark each have a length equal to or shorter than a prescribed length, whether or not a second space not adjacent to the first mark and adjacent to the second mark is longer than the prescribed length.

A reproduction apparatus according to the present invention is a reproduction apparatus for reproducing information from the above-described information recording medium. The reproduction apparatus includes an irradiation section for irradiating the track with laser light; a light receiving section for receiving reflected light of the laser light used for the irradiation; and a reproduction section for reproducing the data sequence based on a signal obtained by the received light.

A recording apparatus according to the present invention is a recording apparatus for recording information on the above-described information recording medium. The recording apparatus includes an irradiation section for irradiating the track with laser light; and a recording section for forming marks on the track by the irradiation to record a data sequence including marks and spaces between the marks arranged alternately.

A reproduction signal evaluation method according to the present invention is a method for evaluating a reproduction signal obtained from an information recording medium on which a data sequence including marks and spaces in combination is recordable. The method includes a recognition step of recognizing a prescribed pattern from the data sequence; and an evaluation step of evaluating a reproduction signal corresponding to the recognized pattern. The recognition step includes the steps of recognizing a pattern, included in the data sequence, including a first mark, a first space adjacent before or after the first mark, and a third space not adjacent to the first space and adjacent to the first mark; and recognizing, when the first mark and the third space each have a length equal to or shorter than a prescribed length, whether or not a third mark not adjacent to the first space and adjacent to the third space is longer than the prescribed length.

An information recording medium according to the present invention is an information recording medium on which a data sequence including marks and spaces in combination is recordable. The information recording medium has a track on which the data sequence is recordable. A reproduction signal from the information recording medium is evaluated using a prescribed method. The prescribed method includes a recognition step of recognizing a prescribed pattern from the data sequence; and an evaluation step of evaluating a reproduction signal corresponding to the recognized pattern. The recognition step includes the steps of recognizing a pattern, included in the data sequence, including a first mark, a first space adjacent before or after the first mark, and a third space not adjacent to the first space and adjacent to the first mark; and recognizing, when the first mark and the third space each have a length equal to or shorter than a prescribed length, whether or not a third mark not adjacent to the first space and adjacent to the third space is longer than the prescribed length.

A reproduction apparatus according to the present invention is a reproduction apparatus for reproducing information from the above-described information recording medium. The reproduction apparatus includes an irradiation section for irradiating the track with laser light; a light receiving section for receiving reflected light of the laser light used for the irradiation; and a reproduction section for reproducing the data sequence based on a signal obtained by the received light.

A recording apparatus according to the present invention is a recording apparatus for recording information on the above-described information recording medium. The recording apparatus includes an irradiation section for irradiating the track with laser light; and a recording section for forming marks on the track by the irradiation to record a data sequence including marks and spaces between the marks arranged alternately.

A reproduction signal evaluation method according to the present invention is a signal evaluation method, usable for an information recording medium having a data sequence including a mark and a space located alternately, for generating a binary signal from a signal obtained by reproducing the data sequence using a PRML signal processing method and evaluating a likelihood of the binary signal. The signal evaluation method comprises a differential metric calculation step of calculating, from the binary signal, a differential metric which is a difference of a reproduction signal from a first state transition path having a maximum likelihood and a second state transition path having a second maximum likelihood; and a step of classifying the differential metric to any of a plurality of data patterns each including at least one mark and at least one space. The data pattern classification to any of a plurality of data patterns is performed using a combination of a length of a first mark included in the data sequence and a length of a first space adjacently located immediately previous or immediately subsequent to the first mark, and is further performed using a length of a second mark which is not adjacent to the first mark and located adjacent to the first space; and thus a reproduction signal quality of the information recording medium is evaluated.

In an embodiment, the classification using the length of the second mark is performed only when the length of the first mark is equal to or shorter than a prescribed length.

In an embodiment, the data pattern classification is further performed using a length of a second space which is located adjacent to neither the first mark nor the first space and located adjacent to the second mark.

In an embodiment, the classification using the length of the second space is performed only when the length of the second mark is equal to or shorter than the prescribed length.

A reproduction signal evaluation method according to the present invention is a signal evaluation method, usable for an information recording medium having a data sequence including a mark and a space located alternately, for generating a binary signal from a signal obtained by reproducing the data sequence using a PRML signal processing method and evaluating a likelihood of the binary signal. The signal evaluation method comprises a differential metric calculation step of calculating, from the binary signal, a differential metric which is a difference of a reproduction signal from a first state transition path having a maximum likelihood and a second state transition path having a second maximum likelihood; and a step of classifying the differential metric to any of a plurality of data patterns each including at least one mark and at least one space. The data pattern classification to any of a plurality of data patterns is performed using a combination of a length of a first mark included in the data sequence and a length of a first space adjacently located immediately previous or immediately subsequent to the first mark, and is further performed using a length of a third space which is not adjacent to the first space and located adjacent to the first mark; and thus a reproduction signal quality of the information recording medium is evaluated.

In an embodiment, the classification using the length of the third space is performed only when the length of the first mark is equal to or shorter than a prescribed length.

In an embodiment, the data pattern classification is further performed using a length of a third mark which is located adjacent to neither the first mark nor the first space and located adjacent to the third space.

In an embodiment, the classification using the length of the third mark is performed only when the length of the third space is equal to or shorter than the prescribed length.

In an embodiment, the prescribed length is a shortest mark length in the data sequence.

An information reproduction apparatus according to the present invention is an information reproduction apparatus, usable for an information recording medium having a data sequence including a mark and a space located alternately, for generating a binary signal from a signal obtained by reproducing the data sequence using a PRML signal processing method and evaluating a likelihood of the binary signal. The information reproduction apparatus comprises a differential metric calculation section for calculating, from the binary signal, a differential metric which is a difference of a reproduction signal from a first state transition path having a maximum likelihood and a second state transition path having a second maximum likelihood; and a pattern detection section for classifying the differential metric to any of a plurality of data patterns each including at least one mark and at least one space. The data pattern classification to any of a plurality of data patterns is performed using a combination of a length of a first mark included in the data sequence and a length of a first space adjacently located immediately previous or immediately subsequent to the first mark, and is further performed using a length of a second mark which is not adjacent to the first mark and located adjacent to the first space; and thus a reproduction signal quality of the information recording medium is evaluated.

In an embodiment, the classification using the length of the second mark is performed only when the length of the first mark is equal to or shorter than a prescribed length.

In an embodiment, the data pattern classification is further performed using a length of a second space which is located adjacent to neither the first mark nor the first space and located adjacent to the second mark.

In an embodiment, the classification using the length of the second space is performed only when the length of the second mark is equal to or shorter than the prescribed length.

An information reproduction apparatus according to the present invention is an information reproduction apparatus, usable for an information recording medium having a data sequence including a mark and a space located alternately, for generating a binary signal from a signal obtained by reproducing the data sequence using a PRML signal processing method and evaluating a likelihood of the binary signal. The information reproduction apparatus comprises a differential metric calculation section for calculating, from the binary signal, a differential metric which is a difference of a reproduction signal from a first state transition path having a maximum likelihood and a second state transition path having a second maximum likelihood; and a pattern detection section for classifying the differential metric to any of a plurality of data patterns each including at least one mark and at least one space. The data pattern classification to any of a plurality of data patterns is performed using a combination of a length of a first mark included in the data sequence and a length of a first space adjacently located immediately previous or immediately subsequent to the first mark, and is further performed using a length of a third space which is not adjacent to the first space and located adjacent to the first mark; and thus a reproduction signal quality of the information recording medium is evaluated.

In an embodiment, the classification using the length of the third space is performed only when the length of the first mark is equal to or shorter than a prescribed length.

In an embodiment, the data pattern classification is further performed using a length of a third mark which is located adjacent to neither the first mark nor the first space and located adjacent to the third space.

In an embodiment, the classification using the length of the third mark is performed only when the length of the third space is equal to or shorter than the prescribed length.

In an embodiment, the prescribed length is a shortest mark length in the data sequence.

The present invention is especially useful in the technical field of performing signal processing using a maximum likelihood decoding method.

What is claimed is:

1. A reproduction signal evaluation method, comprising:
a step of generating a binary signal from an information recording medium on which a data sequence including marks and spaces in combination is recordable, using a PRML signal processing method from a signal obtained by reproducing the data sequence; and
a differential calculation step of calculating a differential metric using a first state transition path having a maximum likelihood and a second state transition path having a second maximum likelihood, and a reproduction signal, the first state transition path and the second state transition path being obtained based on the binary signal;
wherein in a pattern including a shortest mark and a shortest space adjacent before or after the shortest mark, a shift amount of an edge adjacent to the shortest space of the shortest mark is obtained from a differential metric calculated regarding one of:
a first pattern in which a space adjacent to the shortest mark and not adjacent to the shortest space is longer than the shortest space; and
a second pattern in which a mark adjacent to the shortest space and not adjacent to the shortest mark is longer than the shortest mark,
wherein where a reference cycle of the data sequence is T, the shortest mark and the shortest space each have a length of 2T; and
where binary data of a pattern including the shortest mark and the shortest space adjacent to each other is represented by "0" and "1", the shift amount of the edge of the shortest mark is obtained from a differential metric calculated regarding a pattern, the binary data of which is "x000110011x" or "x001100111x" ("x" is "0" or "1").

2. An information recording medium on which a data sequence including marks and spaces in combination is recordable, wherein:
the information recording medium has a track on which the data sequence is recordable;
a reproduction signal from the information recording medium is evaluated using a prescribed method;
the prescribed method includes:
a step of generating a binary signal using a PRML signal processing method from a signal obtained by reproducing the data sequence from the information recording medium; and
a differential calculation step of calculating a differential metric using a first state transition path having a maximum likelihood and a second state transition path having a second maximum likelihood, and a reproduction signal, the first state transition path and the second state transition path being obtained based on the binary signal; and
in a pattern including a shortest mark and a shortest space adjacent before or after the shortest mark, a shift amount of an edge adjacent to the shortest space of the shortest mark is obtained from a differential metric calculated regarding one of:
a first pattern in which a space adjacent to the shortest mark and not adjacent to the shortest space is longer than the shortest space; and
a second pattern in which a mark adjacent to the shortest space and not adjacent to the shortest mark is longer than the shortest mark,
wherein where a reference cycle of the data sequence is T, the shortest mark and the shortest space each have a length of 2T; and
where binary data of a pattern including the shortest mark and the shortest space adjacent to each other is represented by "0" and "1", the shift amount of the edge of the shortest mark is obtained from a differential metric calculated regarding a pattern, the binary data of which is "x000110011x" or "x001100111x" ("x" is "0" or "1").

3. A reproduction apparatus for reproducing information from the information recording medium of claim 2, the reproduction apparatus comprising:
- an irradiation section for irradiating the track with laser light;
- a light receiving section for receiving reflected light of the laser light used for the irradiation; and
- a reproduction section for reproducing the data sequence based on a signal obtained by the received light.

4. A recording apparatus for recording information on the information recording medium of claim 2, the recording apparatus comprising:
- an irradiation section for irradiating the track with laser light; and
- a recording section for forming marks on the track by the irradiation to record a data sequence including marks and spaces between the marks arranged alternately.

* * * * *